(12) United States Patent
Naruse et al.

(10) Patent No.: US 9,417,594 B2
(45) Date of Patent: Aug. 16, 2016

(54) VOLTAGE GENERATING APPARATUS AND IMAGE FORMING APPARATUS INCLUDING THE SAME

(71) Applicant: CANON KABUSHIKI KAISHA, Tokyo (JP)

(72) Inventors: Miki Naruse, Susono (JP); Atsuhiko Yamaguchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 14/329,845

(22) Filed: Jul. 11, 2014

(65) Prior Publication Data
US 2015/0023065 A1    Jan. 22, 2015

(30) Foreign Application Priority Data

Jul. 22, 2013  (JP) .................................. 2013-152097
Jul. 22, 2013  (JP) .................................. 2013-152100

(51) Int. Cl.
| H02M 3/335 | (2006.01) |
| G03G 15/00 | (2006.01) |
| H02M 1/36 | (2007.01) |

(52) U.S. Cl.
CPC ............ *G03G 15/80* (2013.01); *G03G 15/5004* (2013.01); *H02M 1/36* (2013.01); *H02M 3/33523* (2013.01)

(58) Field of Classification Search
CPC .................... H02M 3/33507; H02M 3/33523; H02M 1/36; G03G 15/80; G03G 15/5004
See application file for complete search history.

(56) References Cited

U.S. PATENT DOCUMENTS

| 5,552,861 A | * | 9/1996 | Mizude | .............. G03G 15/1645 399/50 |
| 7,265,479 B2 | | 9/2007 | Yamaguchi et al. | |
| 7,425,789 B2 | | 9/2008 | Yasukawa et al. | |
| 7,548,708 B2 | | 6/2009 | Nagasaki et al. | |
| 2013/0129367 A1 | * | 5/2013 | Jeong | ................ H02M 3/33507 399/37 |
| 2015/0003856 A1 | * | 1/2015 | Umimura | ........... G03G 15/5004 399/88 |

FOREIGN PATENT DOCUMENTS

| JP | 9-93920 A | 4/1997 |
| JP | 2000-102249 A | 4/2000 |

* cited by examiner

*Primary Examiner* — Matthew Nguyen
(74) *Attorney, Agent, or Firm* — Fitzpatrick, Cella, Harper & Scinto

(57) ABSTRACT

Until an output voltage of a converter reaches a threshold value, a control part performs switching control, and after the output voltage reaches the threshold value, the control part performs supply voltage control while the state of a switching control signal at the time when the output voltage reaches the threshold value is maintained. Switching control is a control method in which the output voltage is adjusted by adjusting the frequency or duty ratio of the switching control signal that drives a driving part. Supply voltage control is a control method in which the output voltage is adjusted by adjusting the supply voltage that is applied to the primary side of the converter.

23 Claims, 20 Drawing Sheets

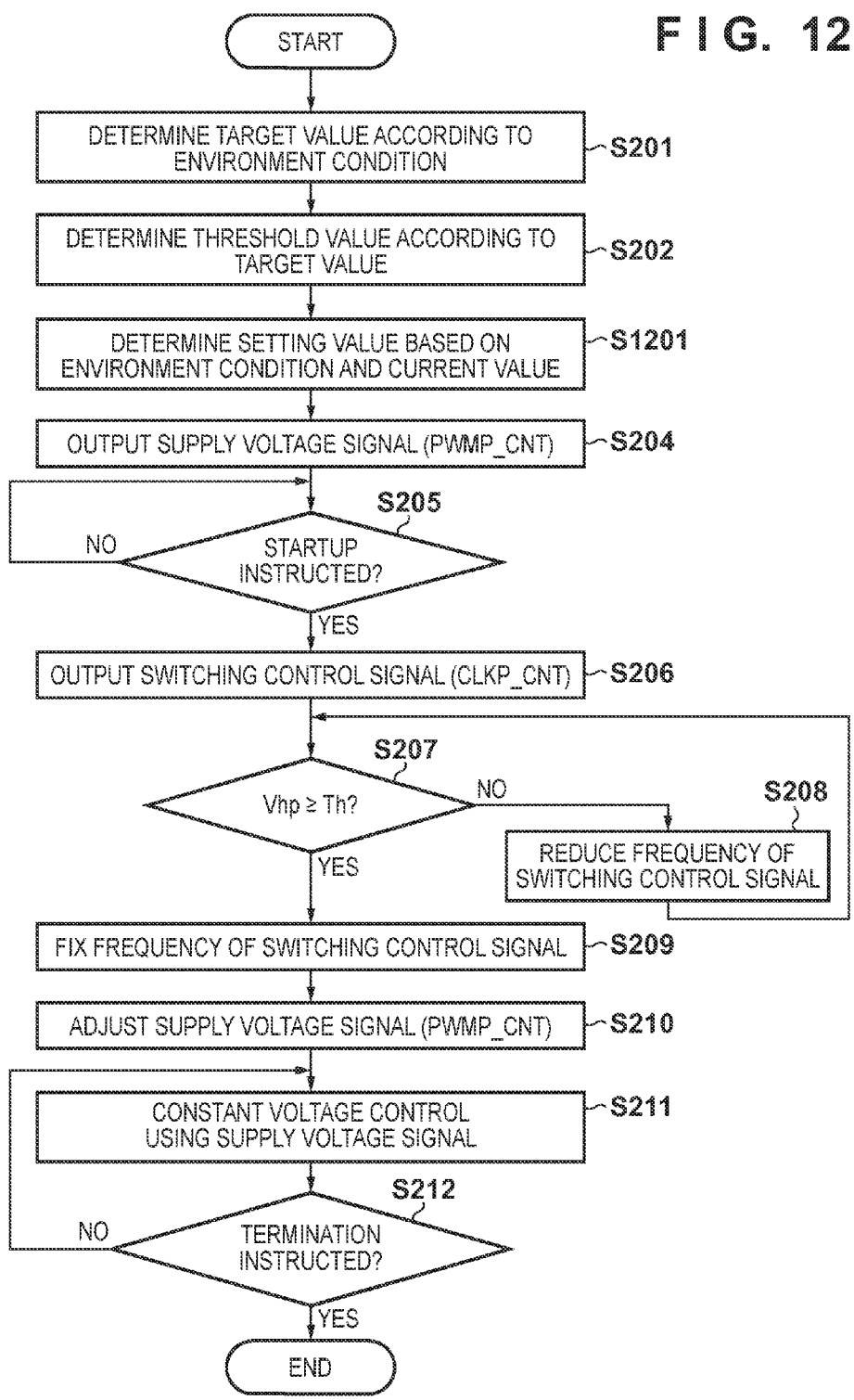
F I G. 12

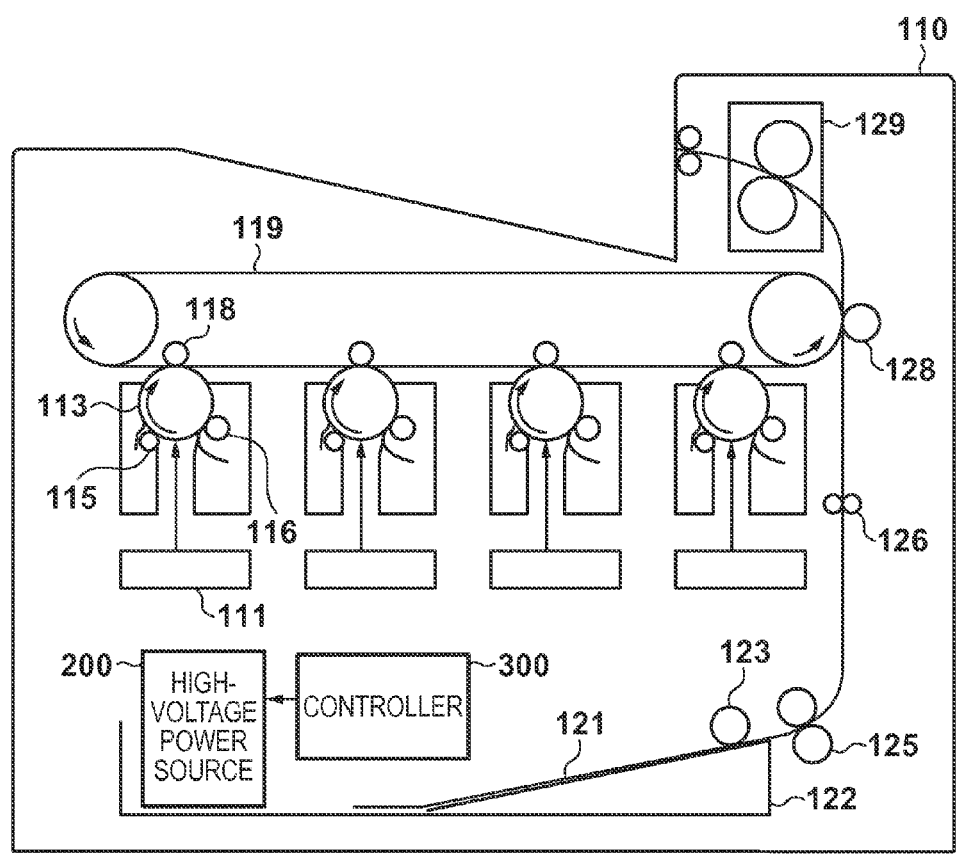
F I G. 14

VOLTAGE GENERATING APPARATUS AND IMAGE FORMING APPARATUS INCLUDING THE SAME

BACKGROUND OF THE INVENTION

1. Field of the Invention

The present invention relates to a voltage generating apparatus and to a voltage generating apparatus that supplies a high DC voltage to an electrophotographic image forming apparatus for example.

2. Description of the Related Art

With an electrophotographic image forming apparatus, DC voltage is often used as the charging voltage applied to a charging apparatus, as the developing voltage applied to a developing apparatus, and as the transfer voltage applied to a transfer apparatus. Japanese Patent Laid-Open No. 2000-102249 proposes a high-voltage power source apparatus that supplies stable power to a load whose impedance varies greatly. Depending on the state of the environment, this high-voltage power source apparatus performs at least one of the following: changing the voltage value of the DC voltage that is to be supplied to the primary winding of a step-up transformer (boost transformer), thinning out a pulse width modulation signal generated by a signal generation unit, and changing the frequency of the pulse width modulation signal generated by the signal generation unit.

Japanese Patent Laid-Open No. 9-93920 discloses an invention that achieves a higher charging speed for a capacitive load and stabilizes output such that overshooting and hunting do not occur in a DC high-voltage power source apparatus for a capacitive load. Specifically, the invention disclosed in Japanese Patent Laid-Open No. 9-93920 rapidly charges a load until the output voltage reaches a reference voltage of 90%, and upon reaching 90%, the charging speed is slowed down so as to prevent overshooting and hunting.

The invention disclosed in Japanese Patent Laid-Open No. 2000-102249 might be able to stabilize the output voltage when the load varies greatly due to the environment as well. However, with the method of raising the output by changing the DC voltage on the primary side of the transformer, it is difficult to raise the output voltage at a high speed. This is because a bottleneck occurs in the amount of time needed to charge an electrolytic capacitor arranged on the primary side of the transformer. With the method of thinning out the pulse width modulation signal, ripples tend to increase in size when constant voltage control is performed on the output of a transformer with a high output performance. Furthermore, with the method of changing the frequency of the pulse width modulation signal, there is a risk that the desired output voltage will not be obtained, depending on the characteristics of the transformer. In the invention disclosed in Japanese Patent Laid-Open No. 9-93920, an integrator circuit is arranged on the input side of a circuit that outputs a PWM pulse, and startup time (integration time) is needed when the on-duty width of the PWM pulse is to be raised to the maximum duty width.

SUMMARY OF THE INVENTION

In view of this, the present invention furthermore shortens the amount of time for raising the output voltage while reducing output voltage overshooting and undershooting.

The present invention provides a voltage generating apparatus comprising the following element. A step-up transformer. A switch circuit is configured to drive the step-up transformer. A signal generation unit is configured to generate a switching control signal for driving the switch circuit. A voltage supply circuit is configured to generate a supply voltage for the primary side of the step-up transformer. A setting value determining unit is configured to determine a setting value for the supply voltage from the voltage supply circuit. A voltage detection circuit is configured to detect an output voltage on the secondary side of the step-up transformer. A control unit configured to control the switch circuit and the voltage supply circuit. The control unit is further configured to, until the output voltage reaches a threshold value before reaching a target value, perform switching control in which the output voltage is adjusted by adjusting the frequency or the duty ratio of the switching control signal. The control unit is further configured to, after the output voltage reaches the threshold value, perform supply voltage control in which the output voltage is adjusted by adjusting the supply voltage while the state of the switching control signal at the time when the output voltage reached the threshold value is maintained.

Further features of the present invention will become apparent from the following description of exemplary embodiments with reference to the attached drawings.

BRIEF DESCRIPTION OF THE DRAWINGS

FIG. 12 is a flowchart showing an example of a method for controlling the voltage generating apparatus.

FIG. 14 is a diagram showing an example of an image forming apparatus.

DESCRIPTION OF THE EMBODIMENTS

Embodiment 1

A voltage generating apparatus of the present embodiment uses switching control to raise an output voltage until the output voltage reaches a threshold value that is smaller than a target value, and thereafter, the voltage generating apparatus uses supply voltage control to bring the output voltage closer to the target value while maintaining the state of a switching control signal at the time when the output voltage reached the threshold value. In other words, the occurrence of overshooting and undershooting is reduced by using switching control to raise the output voltage at a high speed and using supply voltage control near the target value to stably control the output voltage so as to be at the target value.

Figure 1:
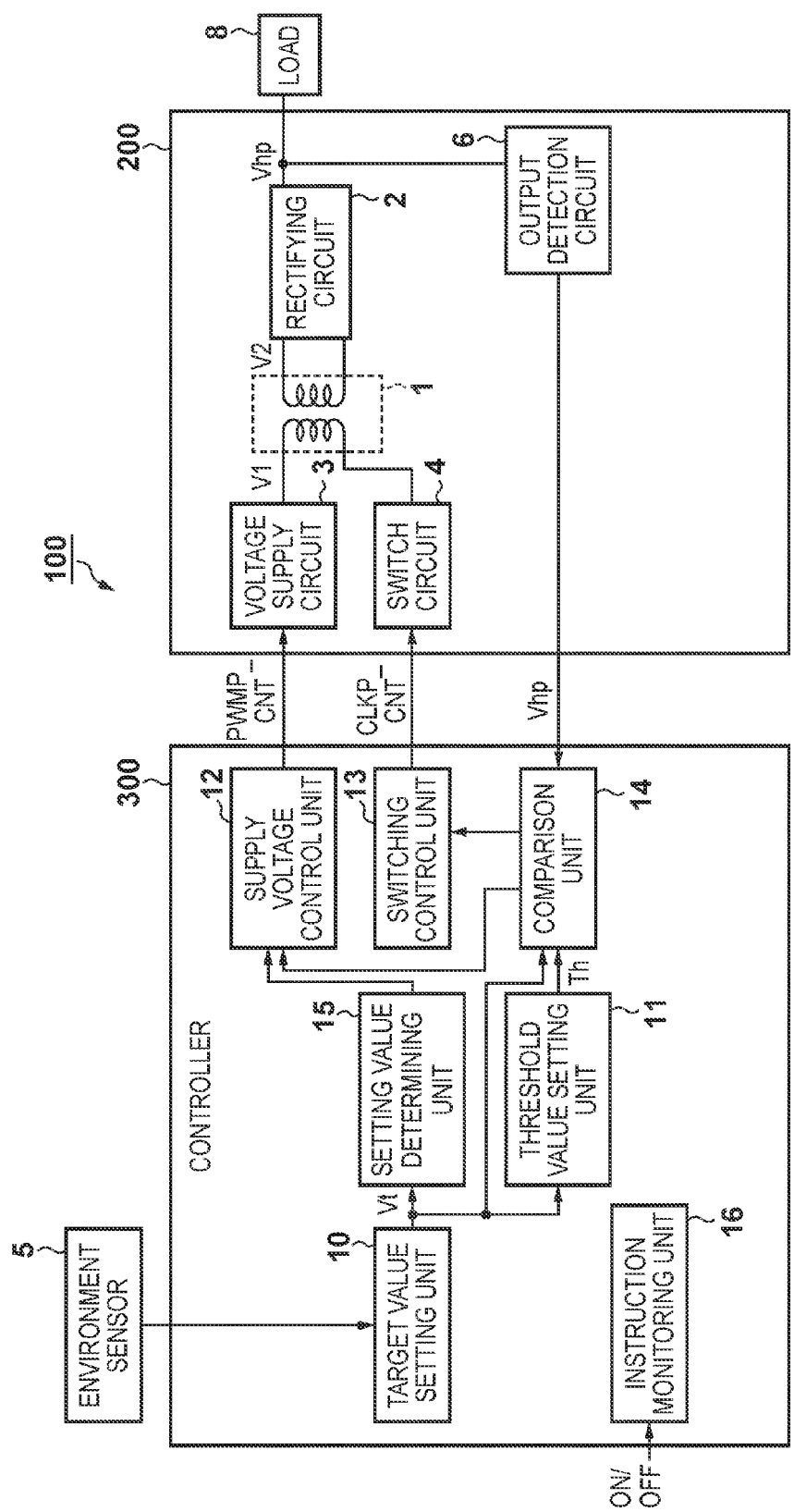
FIG. 1 is a functional block diagram of a voltage generating apparatus.

FIG. 1 is a block diagram showing a high-voltage power source unit 200 and a controller 300 that constitute a voltage generating apparatus 100. In the high-voltage power source unit 200, a voltage supply circuit 3 is an example of a voltage supply circuit that generates a supply voltage V1 to be supplied to the primary side of a step-up transformer 1. The step-up transformer 1 works as a converter for converting an input voltage into an output voltage. The voltage supply circuit 3 generates a supply voltage V1 that corresponds to a supply voltage signal (hereinafter referred to as "PWMP_CNT") from the controller 300 and applies it to the primary side of the step-up transformer 1 for example. A switch circuit 4 is a circuit for driving c in accordance with a switching control signal (hereinafter referred to as "CLKP_CNT") from the controller 300. A switch circuit 4 works as a driving part for driving the transformer 1. The step-up transformer 1 is a voltage conversion module that steps up a primary-side voltage (supply voltage V1) supplied from the voltage supply circuit 3 to a secondary-side voltage V2. A rectifying circuit 2 is a circuit that is connected to the secondary side of the step-up transformer 1, rectifies the secondary-side voltage V2 that is output from the secondary winding of the step-up transformer 1, and generates a DC output voltage Vhp. An output detection circuit 6 is a circuit for detecting the rectified output voltage Vhp from the step-up transformer 1. A load 8 is a load that is connected to the output end of the high-voltage power source unit 200 and receives the output voltage Vhp.

An environment sensor 5 is a sensor for sensing an environment condition (e.g., amount of moisture, humidity, and/or temperature). The controller 300 is an example of a control unit or a control part for controlling the switch circuit 4 and the voltage supply circuit 3. The controller 300 has a port for outputting PWMP_CNT, a port for outputting CLKP_CNT, and an input port for receiving input of a voltage Vsns (referred to as "output voltage Vhp" for the sake of convenience) that is proportional to the output voltage Vhp. The controller 300 generates PWMP_CNT and CLKP_CNT based on the sensing result of the environment sensor 5 and the detection result of the output detection circuit 6 and controls the voltage supply circuit 3 and the switch circuit 4. Note that the output detection circuit 6 is an example of a voltage detection circuit for detecting the output voltage Vhp on the secondary side of the step-up transformer 1.

The controller 300 includes a CPU, a ROM, and a RAM and realizes various functions by executing programs stored in the ROM. A target value setting unit 10 functions as a target value determining unit for determining the target value Vt based on the environment condition sensed by the environment sensor 5. In other words, the target value setting unit 10 determines the target value Vt for the output voltage Vhp of the step-up transformer 1 based on the sensing result of the environment sensor 5. A threshold value setting unit 11 functions as a threshold value determining unit that determines a threshold value Th according to the sensing result of the environment sensor 5, the target value Vt of the step-up transformer 1, or the impedance of the load 8, for example. A setting value determining unit 15 determines a setting value V1set for the supply voltage V1 according to the sensing result of the environment sensor 5, the target value Vt, or the threshold value Th and sets it in a supply voltage control unit 12. The supply voltage control unit 12 generates the supply voltage signal PWMP_CNT according to the setting value V1set that was set by the setting value determining unit 15 and supplies the supply voltage signal to the voltage supply circuit 3. The setting value determining unit 15 is an example of a setting value determining unit that determines the setting value V1set for the supply voltage V1 from the voltage supply circuit 3. A switching control unit 13 is an example of a signal generation unit that generates a switching control signal for driving a switch circuit. For example, the switching control unit 13 generates CLKP_CNT according to the result of comparing the threshold value Th and the output voltage Vhp in a comparison unit 14 and supplies CLKP_CNT to the switch circuit 4. The comparison unit 14 is an example of a comparison unit for comparing the output voltage Vhp and the threshold value Th that is smaller than the target value Vt for the output voltage Vhp. An instruction monitoring unit 16 monitors whether or not a startup instruction to start up the high-voltage power source unit 200 has been received from a superordinate controller. Note that the startup instruction is a command for instructing the start of outputting the output voltage Vhp.

Figure 2:
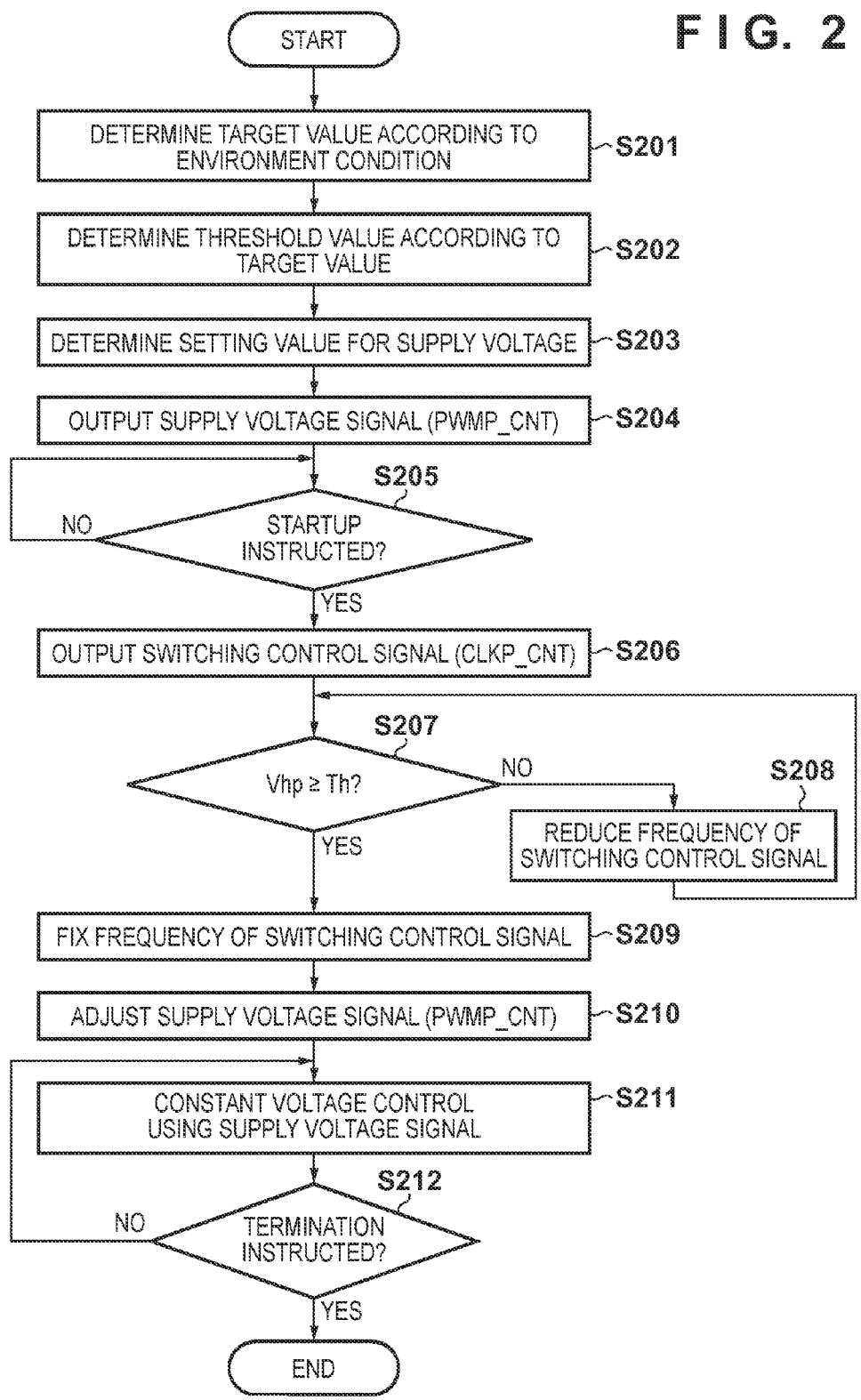
FIG. 2 is a flowchart showing an example of a method for controlling the voltage generating apparatus.
Figure 3:
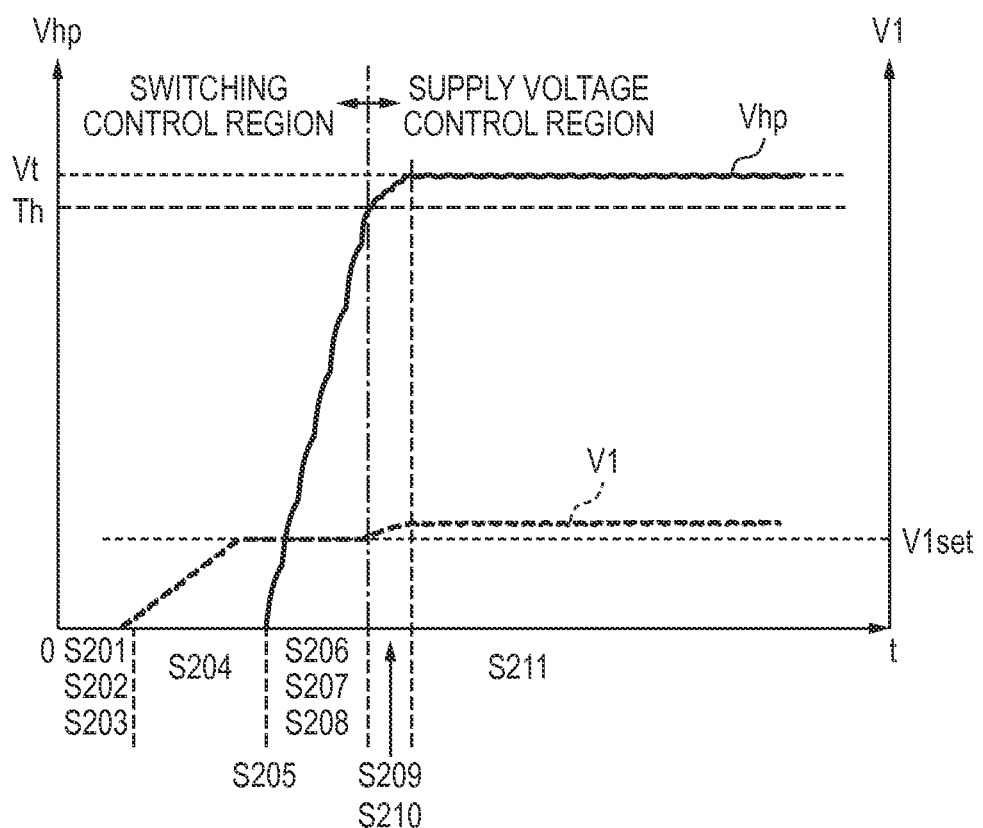
FIG. 3 is a diagram showing an example of a relationship between a rising waveform of an output voltage, a rising waveform of a supply voltage, a target value, a threshold value, and a setting value.

Operations of the voltage generating apparatus 100 will be described next with reference to FIGS. 2 and 3. FIG. 2 is a flowchart showing the steps of a program executed by the CPU included in the controller 300. The CPU functions as the above-described units by executing a program stored in the ROM. FIG. 3 is a diagram for describing the relationship between the output voltage Vhp and the supply voltage V1, and the switching of control. In Embodiment 1, as shown in FIG. 3, the region corresponding to the time after when the high-voltage power source unit 200 is started up until the time when the output voltage Vhp reaches the threshold value Th will be referred to as "switching control region". Also, the control region starting from the time when the output voltage Vhp reaches the threshold value Th will be referred to as "supply voltage control region". In particular, in Embodiment 1, when the comparison unit 14 detects that the output voltage Vhp has reached the threshold value Vt, the controller 300 transitions from the switching control region to the supply voltage control region. The switching control region is a region in which the output voltage Vhp is raised at a high speed (high-speed raising region), and the supply voltage control region is a region for accurately and stably controlling the output voltage Vhp so as to be at the target value Vt. Note that the supply voltage control region is furthermore divided into a region for raising the output voltage Vhp from the threshold value Th to the target value Vt (stable raising region), and a region for maintaining the output voltage Vhp at the target value Vt (constant voltage control region).

In step S201, the controller 300 (target value setting unit 10) determines the target value Vt for the output voltage Vhp according to the sensing result (environment condition) of the environment sensor 5. The target value Vt is determined using an equation or a table indicating the correspondence relationship between the environment condition and the target value Vt.

In step S202, based on the target value Vt, the controller 300 (threshold value setting unit 11) determines a threshold value Th such that overshooting does not occur with the output voltage Vhp. For example, the controller 300 uses a table, an equation, or the like to determine the threshold value Th based on the target value Vt. For example, a voltage value that is 90% of the target value Vt is determined as the threshold value Th (Th=0.9Vt).

In step S203, based on the target value Vt, the controller 300 (setting value determining unit 15) determines the setting value V1set for the supply voltage V1. For example, the controller 300 uses a table, an equation, or the like to determine the setting value V1set based on the target value Vt.

In step S204, based on the setting value V1set, the controller 300 (supply voltage control unit 12) generates PWMP_CNT and supplies PWMP_CNT to the voltage supply circuit 3 such that a supply voltage V1 that matches the setting value V1set determined by the setting value determining unit 15 is output from the voltage supply circuit 3. The voltage supply circuit 3 adjusts the supply voltage V1 such that the supply voltage V1 matches the setting value V1set. As a result, the supply voltage V1 is maintained at the setting value V1set. In this way, the supply voltage V1 is raised in advance to a desired voltage. A capacitor is provided in the voltage supply circuit 3 and is charged such that the voltage between the two ends of the capacitor is the supply voltage V1. Accordingly, by charging the capacitor in advance, the amount of time for raising the output voltage Vhp can be furthermore shortened.

In step S205, the controller 300 (instruction monitoring unit 16) determines whether or not a startup instruction to start up the high-voltage power source unit 200 has been received from a superordinate controller that performs control of the controller 300. When a startup instruction is received, the procedure moves to step S206.

In step S206, the controller 300 uses CLKP_CNT to drive the switch circuit 4 and cause the step-up transformer 1 to start outputting the output voltage Vhp.

In step S207, the controller 300 (comparison unit 14) compares the output voltage Vhp and the threshold value Th so as to determine whether or not the output voltage Vhp is greater than or equal to the threshold value Th. If the output voltage Vhp is less than the threshold value Th, the procedure moves to step S208.

In step S208, the controller 300 (switching control unit 13) adjusts CLKP_CNT such that the output voltage Vhp rises further, and the procedure returns to step S207. For example, the controller 300 changes the frequency of CLKP_CNT (period T) by a predetermined adjustment value such that the output voltage Vhp increases. For example, the controller 300 increases the output voltage Vhp by reducing the frequency of CLKP_CNT. In other words, the frequency of CLKP_CNT is swept from a high frequency to a low frequency. Note that there are also cases where it is necessary to increase the frequency of CLKP_CNT in order to increase the output voltage Vhp. In such a case, the controller 300 increases the frequency of CLKP_CNT. In other words, the frequency of CLKP_CNT is swept from a low frequency to a high frequency. Thus, in the switching control region, the output voltage Vhp is raised by adjusting the frequency of CLKP_CNT. It is possible to raise the output voltage Vhp to the threshold value Th at a higher speed with switching control than with supply voltage control in which the setting value V1set for the supply voltage V1 is adjusted so as to increase the output voltage Vhp. Note that CLKP_CNT is a pulse signal, and the off time τoff thereof is kept in a fixed state while the frequency thereof is changed. Thus, the switching control unit 13 functions as a signal generation unit that controls the output voltage by variably controlling the frequency while the off time of the switching control signal, which is a pulse signal, is fixed.

When the output voltage Vhp reaches the threshold value Th in step S207, the procedure moves to step S209 and onward (i.e., the supply voltage control region). In step S209, the controller 300 (switching control unit 13) holds the frequency f1 of CLKP_CNT at the time when the output voltage Vhp reached the threshold value Th in the RAM and fixes the frequency of CLKP_CNT at f1.

In step S210, the controller 300 (supply voltage control unit 12) causes the comparison unit 14 to compare the output voltage Vhp and the target value Vt and adjusts PWMP_CNT according to the comparison result such that the output voltage Vhp is brought closer to the target value Vt. PWMP_CNT is a supply voltage signal that has been subjected to pulse width modulation according to the setting value V1set. The voltage supply circuit 3 variably controls the supply voltage V1 according to PWMP_CNT. As shown in FIG. 3, the frequency of CLKP_CNT is fixed and the supply voltage V1 is adjusted, and thereby the output voltage Vhp changes more slowly and overshooting and hunting are less likely to occur. When the output voltage Vhp reaches the target value Vt, the procedure moves to step S211.

In step S211, the controller 300 (supply voltage control unit 12) executes constant voltage control using PWMP_CNT such that the output voltage Vhp is maintained at the target value Vt. In other words, constant voltage control is realized using the supply voltage control method.

In step S212, the controller 300 determines whether or not a termination instruction has been received from the superordinate controller. Upon receiving a termination instruction, the controller 300 stops the output of PWMP_CNT and CLKP_CNT, thereby causing the high-voltage power source unit 200 to stop.

Figure 4:
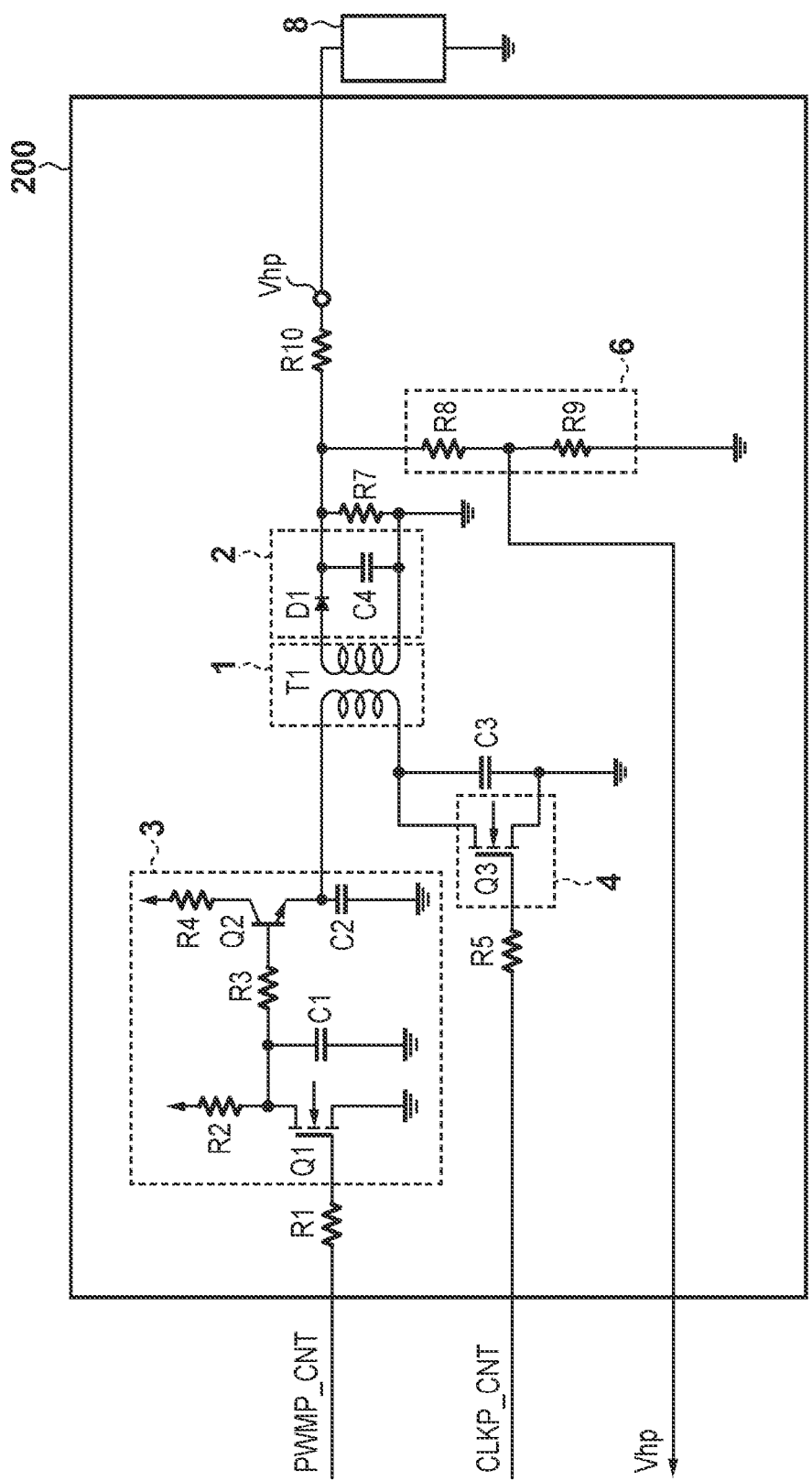
FIG. 4 is a circuit diagram of the voltage generating apparatus.

FIG. 4 is a circuit diagram showing an example of circuits configuring the units of the high-voltage power source unit 200. PWMP_CNT is input via a protective resistor R1 to the gate, which is the control terminal, of a field-effect transistor (FET) Q1 in the voltage supply circuit 3. The drain, which is the current output terminal, of the FET Q1 is connected to a power source Vcc via a resistor R2. The source, which is the current input terminal, of the FET Q1 is grounded. The current output terminal of the FET Q1 is furthermore connected to one end of a capacitor C1 and one end of a resistor R3. The other end of the capacitor C1 is grounded. The other end of the resistor R3 is connected to the base of a transistor Q2. The collector of the transistor Q2 is connected to a power source via a resistor R4. The emitter of the transistor Q2 is grounded via a capacitor C2. Furthermore, the emitter of the transistor Q2 is connected to one end of the primary winding of the transformer T1. Using PWMP_CNT, the FET Q1 is driven and the transistor Q2 is furthermore controlled. According to this, a predetermined voltage (supply voltage V1) is applied to the capacitor C2. The voltage between the two ends of the capacitor C2 (charge voltage) is applied to the primary side of the transformer T1 that constitutes the step-up transformer 1.

The switch circuit 4 is constituted by an FET Q3. CLKP_CNT is applied to the control terminal of the FET Q3 via a protective resistor R5. The current output terminal of the FET Q3 is connected to the other end of the primary winding of the transformer T1. A capacitor C3 is provided between the current output terminal and the current input terminal of the FET Q3. The step-up transformer 1 and the capacitor C3 form a resonance circuit.

The rectifying circuit 2 is constituted by a diode D1 and a capacitor C4. The anode of the diode D1 is connected to one end of the secondary winding of the transformer T1. The cathode of the diode D1 is connected to one end of the capacitor C4, one end of a resistor R7, one end of a resistor R8, and one end of a resistor R10. The other end of the capacitor C4 is connected to the other end of the secondary winding of the transformer T1 and is grounded. The other end of the resistor R7 is also grounded. Thus, the secondary-side voltage V2 of the step-up transformer 1 is rectified by the diode D1 and smoothed by the capacitor C4 and thus becomes the output voltage Vhp. The output voltage Vhp, which is a DC voltage, is applied to the load 8. The output detection circuit 6 is a voltage-dividing circuit (voltage detection circuit) that divides the output voltage Vhp by the resistance ratio between the resistor R8 and the resistor R9. A voltage that is proportional to the output voltage Vhp is input to the controller 300.

Advantages of Switching Control

Operations of Embodiment 1 will be described in detail below with reference to FIGS. 4, 5, and 6. PWMP_CNT is a type of pulse signal. The supply voltage control unit 12 generates PWMP_CNT using a duty ratio that corresponds to the setting value V1set, and performs driving by supplying the generated PWMP_CNT to the voltage supply circuit 3. As shown in FIG. 4, the capacitor C2 of the voltage supply circuit 3 is charged and the voltage between the two ends of the capacitor C2 is applied to the primary side of the step-up transformer 1 as the supply voltage V1. The capacitor C2 is connected parallel with the primary side of the step-up transformer 1.

Incidentally, the output voltage Vhp of the step-up transformer 1 can be controlled by adjusting the setting value V1set of the voltage supply circuit 3. In the control of the output voltage Vhp performed by the voltage supply circuit 3 (supply voltage control), the driving for switching the step-up transformer 1 and the supply of the voltage to the primary side of the step-up transformer 1 are performed in parallel. For this reason, there is a problem in that the amount of time for raising the output voltage Vhp becomes longer according to the amount of time for charging the capacitor C2.

On the other hand, in the present embodiment, the capacitor C2 is pre-charged to a desired voltage (V1set), and the switch circuit 4 subsequently raises the output voltage of the step-up transformer 1 at a high speed. According to this, the output voltage Vhp of the step-up transformer 1 can be raised at a higher speed.

Figure 5:
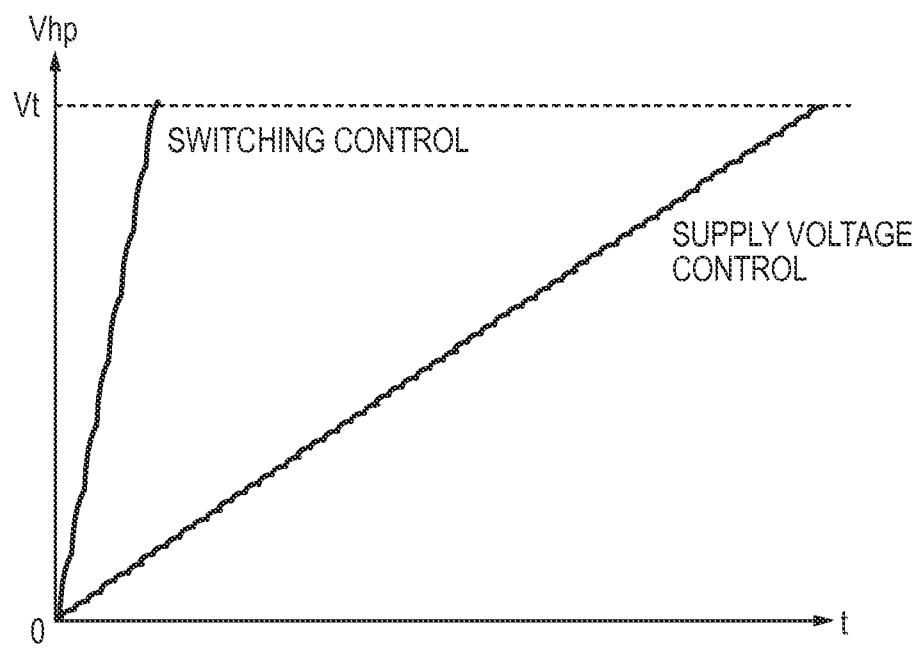
FIG. 5 is a diagram showing an example of output voltage raising times in switching control and supply voltage control.
Figure 6:
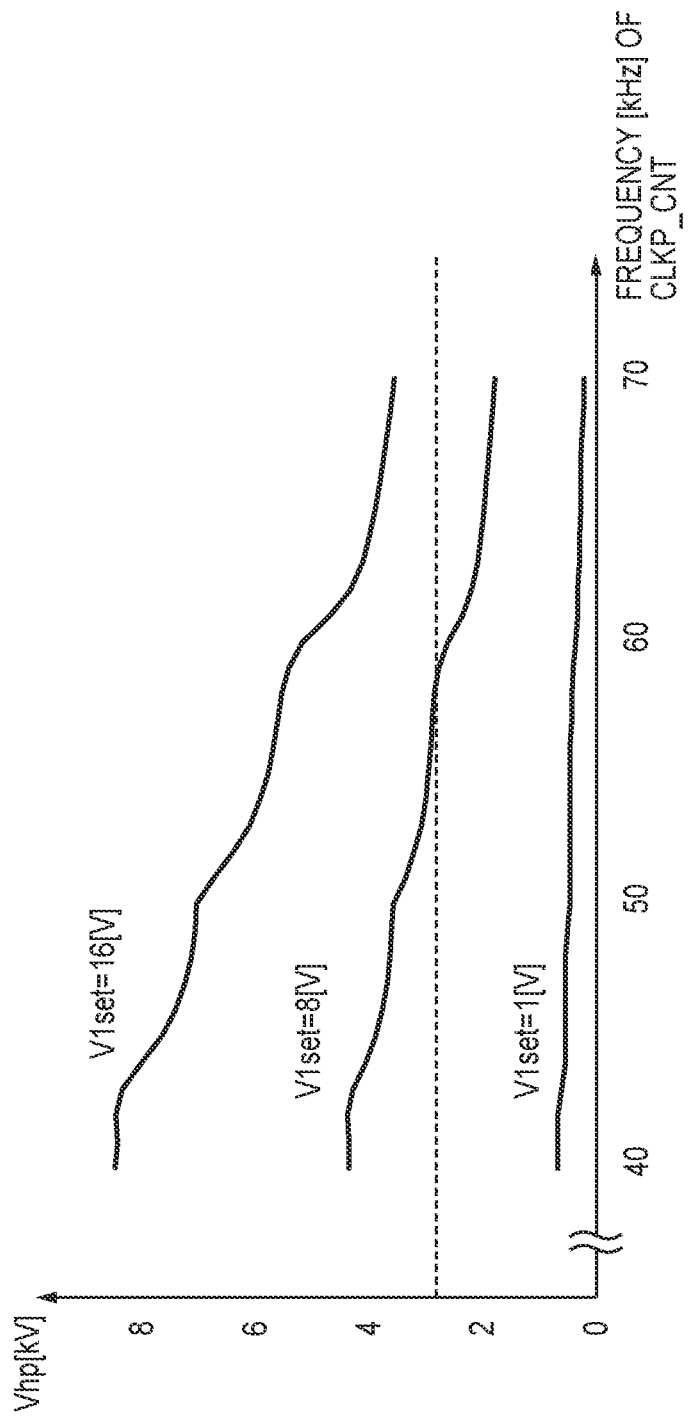
FIG. 6 is a diagram showing an example of a correspondence relationship (step-up transformer characteristics) between the frequency of a switching control signal and output voltage.

FIG. 5 is a diagram showing the amount of time for raising using supply voltage control and the amount of time for raising using switching control. With supply voltage control, the switch circuit 4 is driven constantly, and the output voltage Vhp of the step-up transformer 1 is adjusted by adjusting the setting value V1set of the voltage supply circuit 3. With switching control, the setting value V1set of the step-up transformer 1 is kept constant, and the output voltage Vhp is adjusted under control of the switch circuit 4.

As shown in FIG. 5, with supply voltage control, the output voltage Vhp of the step-up transformer 1 is raised more slowly than with switching control. This is because the amount of time for raising in supply voltage control depends on the amount of time for charging the capacitor C2. On the other hand, with switching control, the output voltage Vhp is controlled using only driving for switching in a state in which the capacitor C2 is pre-charged. For this reason, the amount of time for raising does not depend on the amount of time for charging the capacitor C2.

Here, in the present embodiment, switching control is employed for high-speed raising of the output voltage Vhp. In particular, before the arrival of a startup instruction from the superordinate controller (YES in step S205), the controller 300 determines the setting value V1set, supplies PWMP_CNT to the voltage supply circuit 3, and thus pre-charges the capacitor C2. As shown in FIG. 3, the capacitor C2 is pre-charged and the supply voltage V1 is maintained at the setting value V1set.

Incidentally, the setting value V1set is determined according to the output characteristic of the step-up transformer 1. FIG. 6 shows examples of the output voltage Vhp at the time when the off time τoff of CLKP_CNT is fixed at a certain constant value and subjected to frequency modulation driving. CLKP_CNT is a pulse signal whose off time can be controlled, and to which frequency modulation can be applied. As shown in FIG. 6, the output voltage Vhp varies depending on the supply voltage V1 (setting value V1set) and the frequency of CLKP_CNT. With a step-up transformer 1 having such characteristics, sometimes the upper limit value of the output voltage Vhp that can be output using a certain setting value V1set is lower than the target value Vt. For example, if the setting value V1set is set to 1 V, Vhp cannot be set to 3 kV. In this case, if the setting value V1set is set to 8 V, and the frequency of CLKP_CNT is set to 60 kHz or higher, Vhp can be set to 3 kV. Note that the above-described table or equation for determining the setting value V1set is determined with consideration given to the output characteristics of the step-up transformer 1.

Advantages of Supply Voltage Control

In Embodiment 1, due to the controller 300 (control method switching unit) switching between switching control and supply voltage control, high-speed raising of the output voltage Vhp and stabilization of the output voltage Vhp are achieved. Since the advantages of switching control have been described above, the advantages of supply voltage control will be described here.

Switching control is employed until the output voltage Vhp reaches the threshold value Th. With switching control, the off time of the pulse of CLKP_CNT is fixed at a certain value while the frequency is controlled, and thereby the switch circuit 4 is driven and power is supplied to the primary side of the step-up transformer 1.

To give a more specific description, the rectifying circuit 2 outputs a DC voltage (output voltage Vhp) by rectifying an AC secondary-side voltage V2 that was output from the secondary side of the step-up transformer 1. If the comparison unit 14 determines that the output voltage Vhp detected by the output detection circuit 6 has not yet reached the threshold value Th, the off time τoff of CLKP_CNT is fixed at a certain value, and the frequency of CLKP_CNT is swept from a high frequency to a low frequency by the switching control unit 13. According to this, the duty ratio for the driving for switching on the primary side of the step-up transformer 1 increases, and therefore the power supplied to the primary side of the step-up transformer 1 increases. The off time τoff for the pulse of CLKP_CNT is determined using the resonance circuit formed by the step-up transformer 1 and the capacitor C3. Accordingly, sufficient time is needed for the resonance voltage to be formed. With the step-up transformer 1 having the characteristics described in Embodiment 1, when the duty ratio is simply changed without the off time τoff being fixed (e.g., when the frequency is fixed and the duty ratio D is raised), sometimes the amount of forming time for the resonance voltage is insufficient and the waveform of the resonance voltage will lose shape. As a result of this, the power on the primary side of the step-up transformer 1 will no longer be favorably converted to the secondary side. For this reason, the setting of the off time τoff is important.

When the comparison unit 14 detects that the output voltage Vhp has reached the threshold value Th, the switching control unit 13 switches the control method for the primary side from switching control to supply voltage control. The switching control unit 13 continues driving the switch circuit 4 with the frequency of CLKP_CNT fixed at the frequency f1 at the time when the output voltage Vhp reached the threshold value Th. Since the frequency f1 is fixed, the raising of the output voltage Vhp according to switching control is also stopped.

Figure 7A:
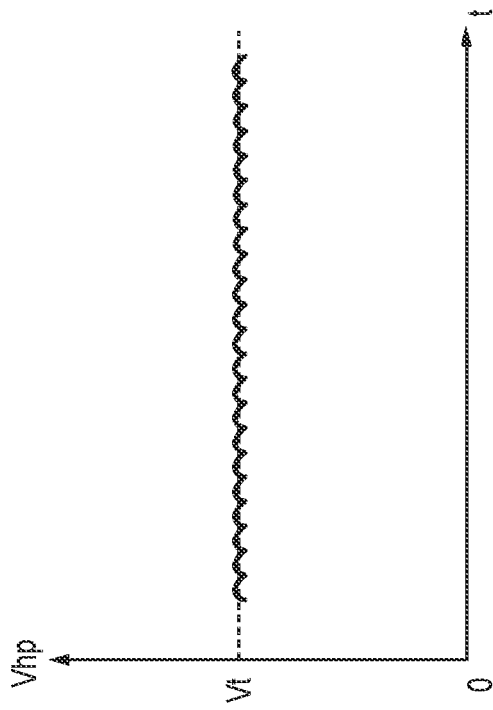
FIG. 7A is a diagram showing an output voltage that is varied using switching control.
Figure 7B:
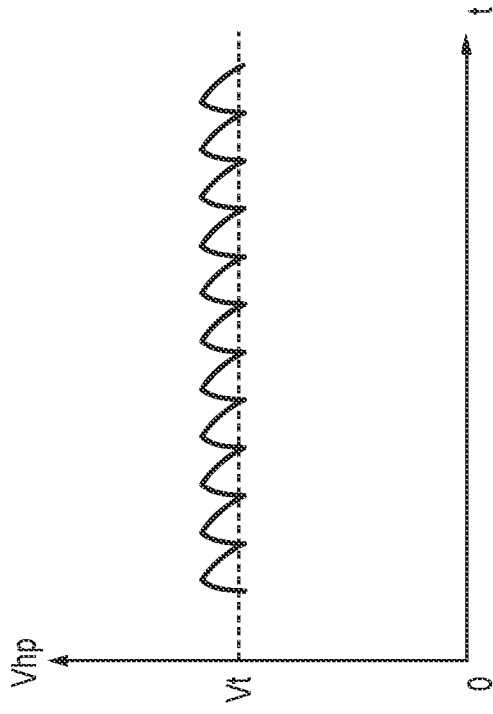
FIG. 7B is a diagram showing an output voltage that is varied using supply voltage control.

FIG. 7A is a diagram showing an example of changes in the output voltage Vhp in switching control. FIG. 7B is a diagram showing an example of changes in the output voltage Vhp in supply voltage control. As described above, with switching control, it is possible to raise the output voltage Vhp at a higher speed than with supply voltage control. On the other hand, with switching control, as shown in FIG. 7A, when the frequency is modulated, the output voltage Vhp changes dramatically. For this reason, ripples are larger in the constant voltage control region. On the other hand, as shown in FIG. 7B, ripples are small if supply voltage control is used. In view of this, by switching to supply voltage control at the time when the output voltage Vhp reaches the threshold value Th, the output voltage Vhp can be brought close to the target value Vt with accuracy and can be stably sustained there.

As described above according to Embodiment 1, until the output voltage Vhp reaches the threshold value Th, the controller 300 employs switching control in which the output voltage Vhp is adjusted by adjusting the frequency of the switching control signal. According to this, it is possible to raise the output voltage Vhp at a high speed. After the output voltage Vhp reaches the threshold value, the controller 300 maintains the state of the switching control signal at the time when the output voltage Vhp reached the threshold value Th. Furthermore, the controller 300 employs supply voltage control in which the output voltage Vhp is adjusted by adjusting the supply voltage V1. According to this, the output voltage Vhp is less likely to be overshot or undershot and is stably maintained at the target value Vt. In this way, in Embodiment 1, the occurrence of overshooting and undershooting is reduced by using switching control to raise the output voltage at a high speed and using supply voltage control near the target value to stably control the output voltage so as to be at the target value. Also, in the constant voltage control region in which the output voltage Vhp is maintained at the target value Vt, supply voltage control is employed, and therefore voltage oscillation such as ripples and hunting can be reduced.

Due to the controller 300 determining the target value Vt, the threshold value Th, and the setting value V1set in advance, the amount of time for raising can be further shortened. In particular, before the instruction monitoring unit 16 detects a startup instruction, the controller 300 determines the target value Vt, the threshold value Th, and the setting value V1set and controls the supply voltage V1 so as to be at the setting value V1set. The voltage supply circuit 3 includes the capacitor C2 that is connected parallel to the primary side of the step-up transformer 1. Accordingly, before the instruction monitoring unit 16 detects a startup instruction, the capacitor C2 is charged such that the voltage between the two ends of the capacitor C2 is the setting value V1set. Then, when the instruction monitoring unit 16 detects a startup instruction, the controller 300 adjusts the frequency or the duty ratio of the switching control signal and starts raising the output voltage Vhp. Accordingly, the amount of time for charging is less likely to have an influence on the amount of time for raising the output voltage Vhp, and faster raising of the output voltage Vhp is realized.

The controller 300 determines the target value Vt based on the environment condition sensed by the environment sensor 5, and therefore the target value Vt can be determined appropriately even if the environment condition changes. By appropriately determining the target value Vt, it is possible to stably control the output voltage Vhp.

As shown in FIG. 3, until the output voltage Vhp reaches the threshold value Th, the setting value determining unit 15 keeps the setting value V1set constant, and after the output voltage Vhp reaches the threshold value Th, the supply voltage V1 is adjusted by variably controlling the setting value V1set. According to this, supply voltage control of the output voltage Vhp is realized.

The threshold value setting unit 11 determines the threshold value Th according to the target value Vt and the like, and thus the occurrence of overshooting and undershooting with the output voltage Vhp is reduced.

Embodiment 2

In Embodiment 1, the frequency (period T) of the switching control signal, which is a pulse signal that repeatedly switches on and off, is controlled while the off time τoff is fixed, and thereby switching control is realized. On the other hand, it is also possible to realize switching control by controlling a parameter other than the frequency. In view of this, in Embodiment 2, switching control is realized by controlling the duty ratio D of the switching control signal. Note that since the other portions are the same as in Embodiment 1, the description thereof will not be repeated.

Figure 8:
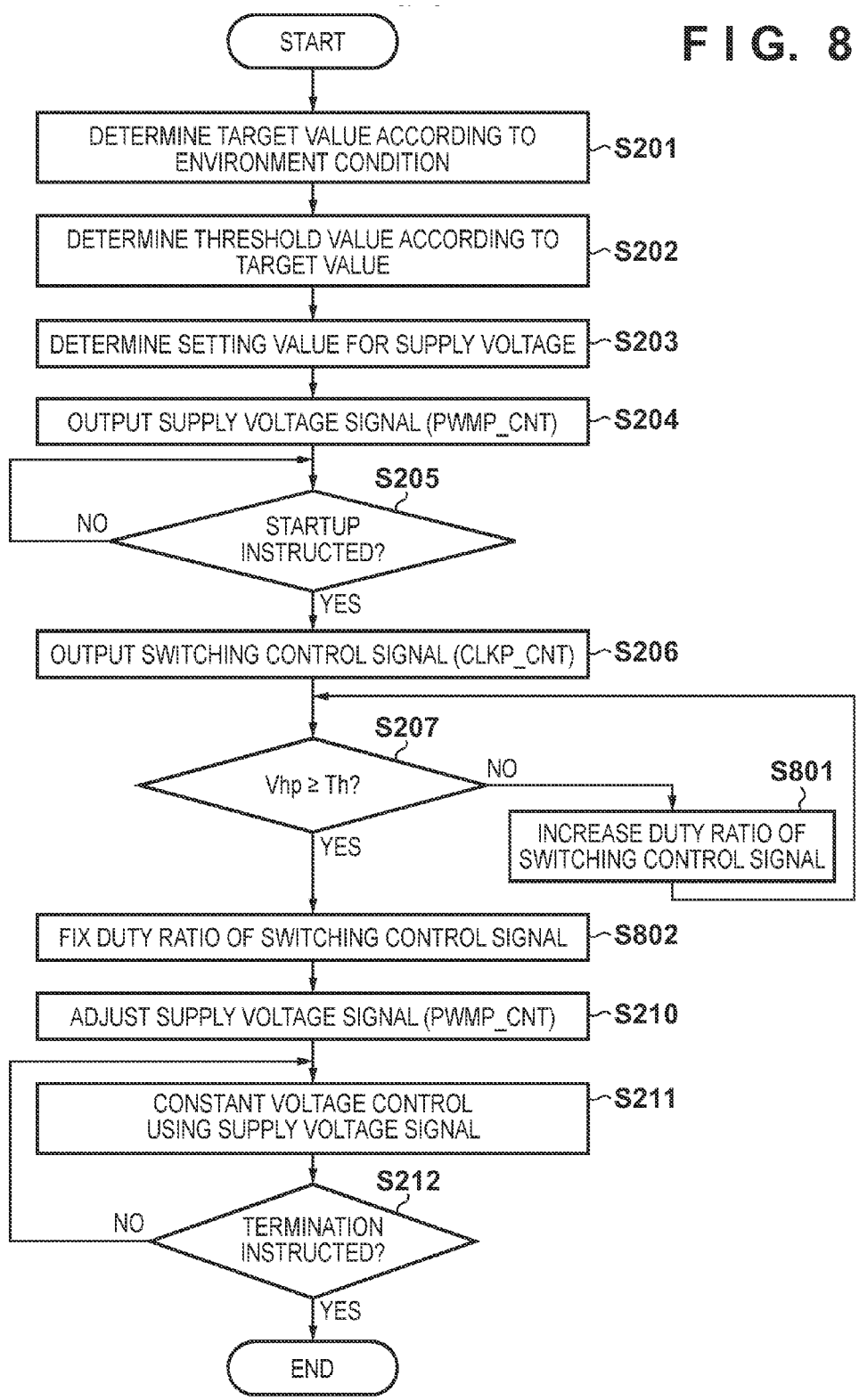
FIG. 8 is a flowchart showing an example of a method for controlling the voltage generating apparatus.

FIG. 8 is a flowchart showing the steps of a program executed by the CPU included in the controller 300. Portions that are the same as those of the flowchart shown in FIG. 2 are denoted by the same reference numerals so as to simplify the description. After steps S201 to S206 are executed, the procedure moves to step S207. In step S207, the controller 300 (comparison unit 14) compares the output voltage Vhp and the threshold value Th so as to determine whether or not the output voltage Vhp is greater than or equal to the threshold value Th. If the output voltage Vhp is less than the threshold value Th, the procedure moves to step S801.

In step S801, the controller 300 (switching control unit 13) increases the duty ratio D of the switching control signal CLKP_CNT by a predetermined amount Δ and moves to step S207. The duty ratio D is defined by the period T of the switching control signal CLKP_CNT and the amount of time for which the pulse is on (τon) (D=τon/T). Here, since the amount of time for which the pulse is off is the off time τoff, the period T of the switching control signal CLKP_CNT satisfies the equation T=τon+τoff. The switching control unit 13 increases the duty ratio D by increasing τon while the period T is fixed. If it is determined in step S207 that the output voltage Vhp is greater than or equal to the threshold value Th, the procedure moves to step S802.

In step S802, the switching control unit 13 holds the duty ratio D0 at the time when the output voltage Vhp reached the threshold value Th in the RAM and fixes the duty ratio D at D0. Thereafter, in steps S210 and S211, when the duty ratio D has been fixed at D0, supply voltage control is executed.

Figure 9:
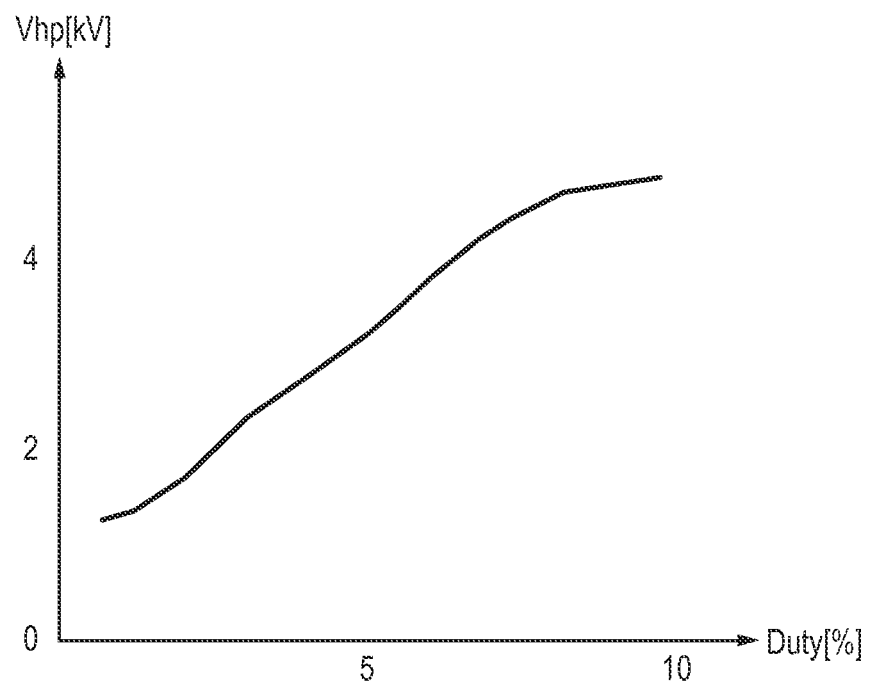
FIG. 9 is a diagram showing an example of a relationship (step-up transformer characteristics) between the duty ratio of a switching control signal and output voltage.

FIG. 9 is a diagram showing an example of the output voltage Vhp from the step-up transformer 1 at the time of controlling the duty ratio of the switching control signal CLKP_CNT. FIG. 9 shows that the output voltage Vhp increases as the duty ratio D increases. Similarly, the output voltage Vhp decreases as the duty ratio D decreases.

In this way, in Embodiment 2, after the supply voltage V1 is set in advance of the raising of the step-up transformer 1, the switch circuit 4 is driven using CLKP_CNT with a controlled duty ratio D. In other words, switching control is started. In particular, before the output voltage Vhp of the step-up transformer 1 reaches the threshold value Th, the duty ratio D of CLKP_CNT is increased, and thereby the output voltage Vhp of the step-up transformer 1 increases. When the output voltage Vhp reaches the threshold value Th, the duty ratio D of CLKP_CNT is fixed at D0 and the switch circuit 4 continues to be driven using CLKP_CNT with the duty ratio D0. Also, the method of controlling the output voltage Vhp is switched from switching control to supply voltage control (control performed using PWMP_CNT). Accordingly, constant voltage control is performed using supply voltage control such that the output voltage Vhp is kept at the target value Vt. In other words, the output voltage Vhp is controlled so as to be stable using supply voltage control.

Thus, with Embodiment 2, the switching control unit 13 functions as a signal generation unit that controls the output voltage Vhp by variably controlling the duty ratio D of the switching control signal, which is a pulse signal. In other words, by controlling the duty ratio D of the switching control signal, the controller 300 realizes switching control and an effect similar to that of Embodiment 1 is achieved. In other words, with Embodiment 2, the output voltage Vhp can be raised to the threshold value Th at a high speed using switching control. Thereafter, the output voltage Vhp is accurately kept at the target value Vt using supply voltage control. Switching control is useful for achieving a higher speed since the amount the output voltage Vhp changes dramatically regardless of which of the frequency and the duty ratio D is varied, but supply voltage control is more useful for achieving stability. In view of this, in the first raising segment for the output voltage Vhp, switching control is executed, and in the last raising segment for the output voltage Vhp (fine adjustment segment), supply voltage control is executed. Supply voltage control is executed in the segment of maintaining the output voltage Vhp as well. Accordingly, it is possible to achieve both high-speed raising of the output voltage Vhp and stability.

Embodiment 3

Embodiment 3 is an invention that gives further consideration to variations in the impedance of the load 8 in the configurations of Embodiments 1 and 2. For this reason, portions that are in common with Embodiments 1 and 2 are denoted by the same reference numerals in order to simplify the description.

Figure 10:
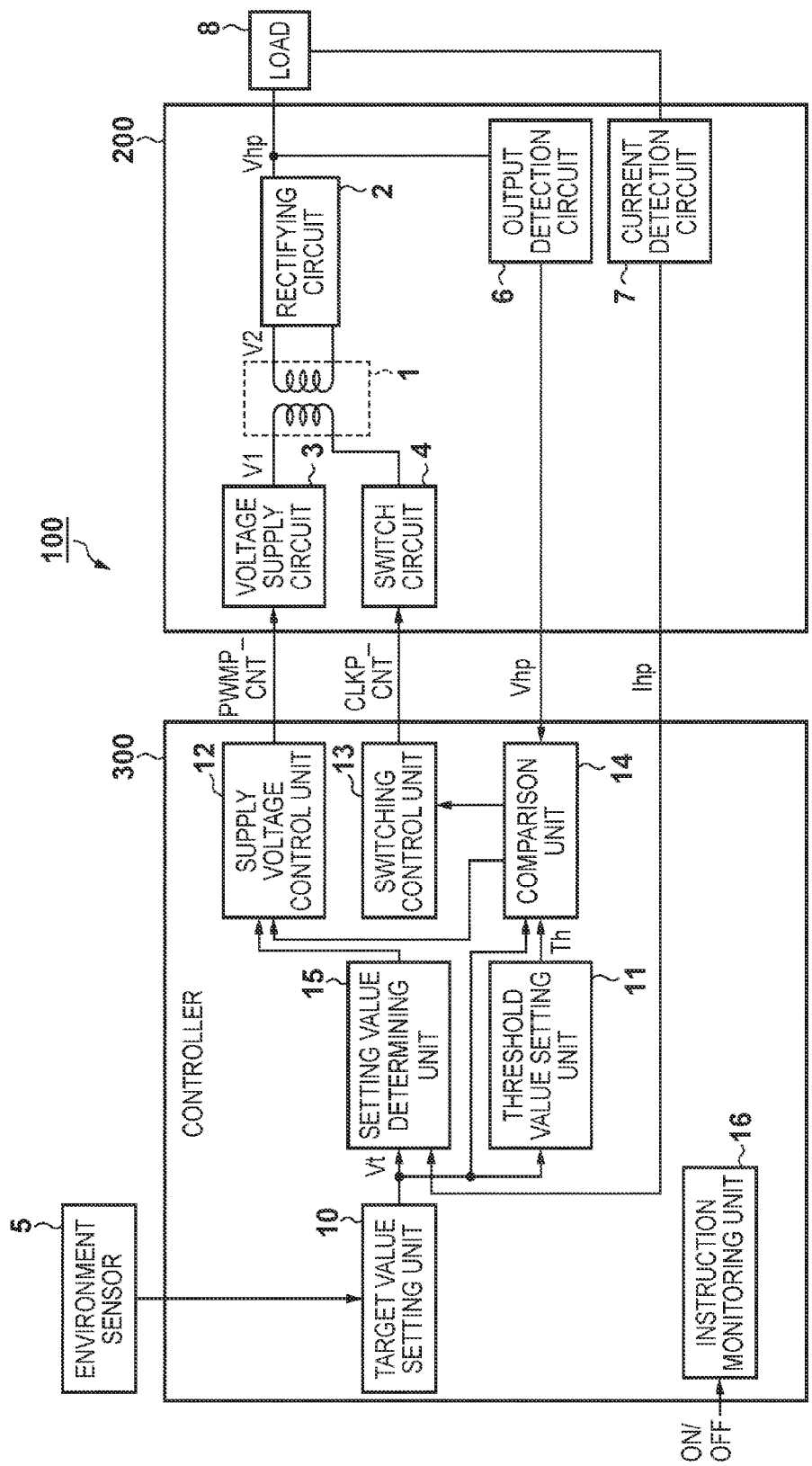
FIG. 10 is a functional block diagram of the voltage generating apparatus.

FIG. 10 is a block diagram showing the voltage generating apparatus 100. In FIG. 10, a current detection circuit 7 for detecting current that flows in the load 8 is provided. The current that flows in the load 8 changes in conjunction with the impedance of the load 8. Accordingly, the impedance of the load 8 can be specified based on the current that flows in the load 8. Accordingly, the current detection circuit 7 also functions as a load detection unit for detecting the impedance of the load 8 to which the output voltage Vhp is applied.

Figure 11:
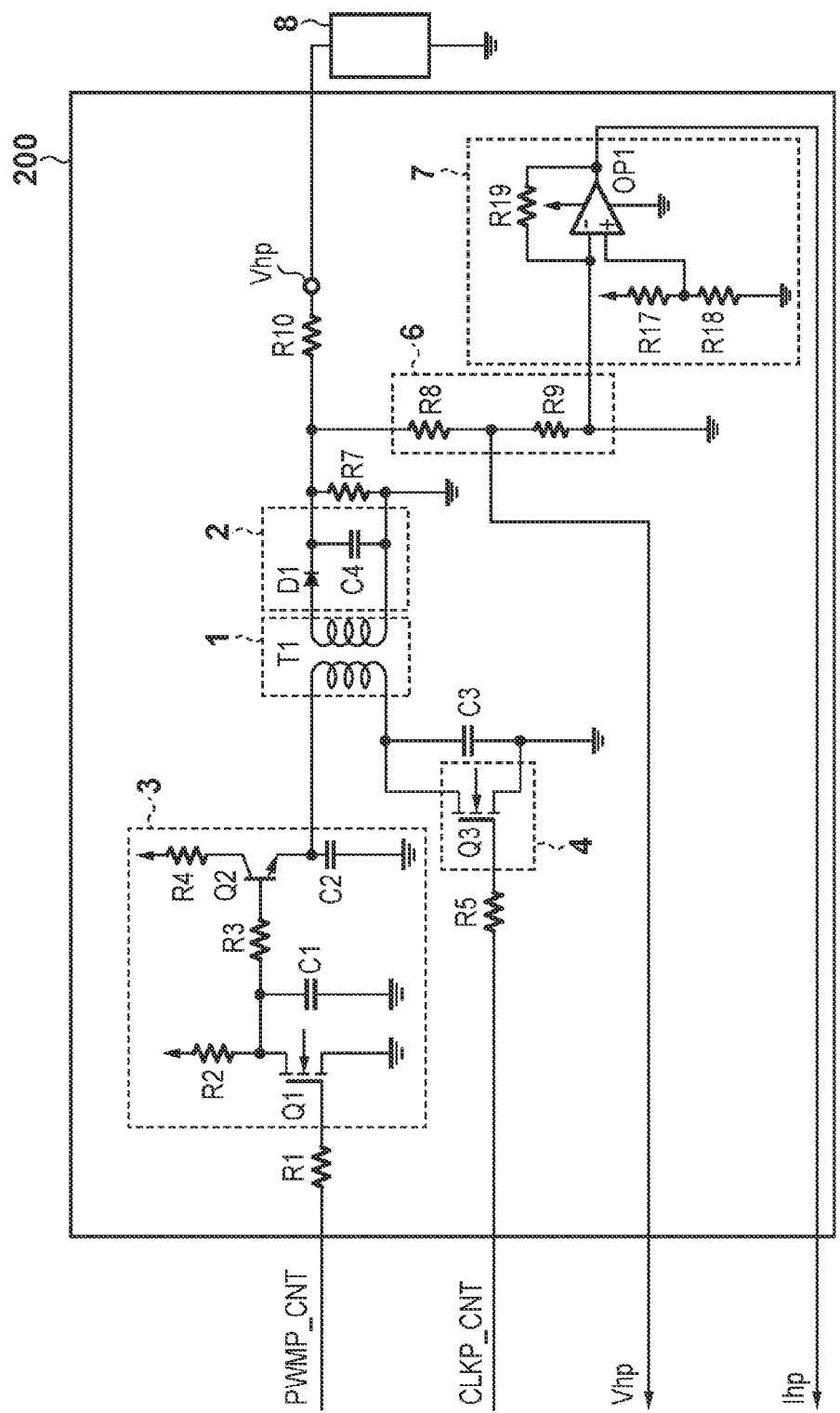
FIG. 11 is a circuit diagram of the voltage generating apparatus.

FIG. 11 is a diagram showing an example of the circuit configuration of the high-voltage power source unit 200. The current detection circuit 7 has resistors R17, R18, and R19, and an operational amplifier OP1. The inverting input terminal of the operational amplifier OP1 is connected to one end of the resistor R9, one end of the resistor R19, and to a grounding potential. The non-inverting input terminal of the operational amplifier OP1 is connected to one end of the resistor R17 and one end of the resistor R18. The other end of the resistor R17 is connected to a power source. The other end of the resistor R18 is grounded. The other end of the resistor R19 is connected to the output terminal of the operational amplifier OP1. The resistors R17 and R18 determine the reference voltage of the operational amplifier OP1. As is evident from FIG. 11, a current that is correlated with a current Ihp that flows in the load flows in the resistor R8 and the resistor R9. The current Ihp is detected by the current detection circuit 7, and the detection value is transferred to the controller 300. In other words, the current Ihp is converted from a current into a voltage by the resistor R19 and transferred to the controller 300. The controller 300 determines the target value Vt, the setting value V1set, and the threshold value Th for the step-up transformer 1 based on the sensing result of the environment sensor 5 and the detection result of the current detection circuit 7. In this way, the threshold value setting unit 11 of the controller 300 functions as a threshold value determining unit that determines the threshold value Th according to the impedance of the load 8, which is the detection result of the current detection circuit 7. Note that the target value Vt may be determined according to the impedance of the load 8 and the threshold value Th may be determined according to the target value Vt. Thus, it is possible to indirectly determine the threshold value Th based on the sensing result of the environment sensor 5.

FIG. 12 is a flowchart showing the steps of a program executed by the CPU included in the controller 300. In FIG. 12, step S203 shown in FIG. 2 has been replaced by step S1201. Needless to say, steps S208 and S209 may be replaced by steps S801 and S802 in Embodiment 2. After steps S201 and S202 have been executed, the procedure moves to step S1201. Note that in step S202, the threshold value setting unit 11 may determine the threshold value Th such that the difference between the target value Vt and the threshold value Th is always a constant value v (Th=Vt−v).

Figure 13:
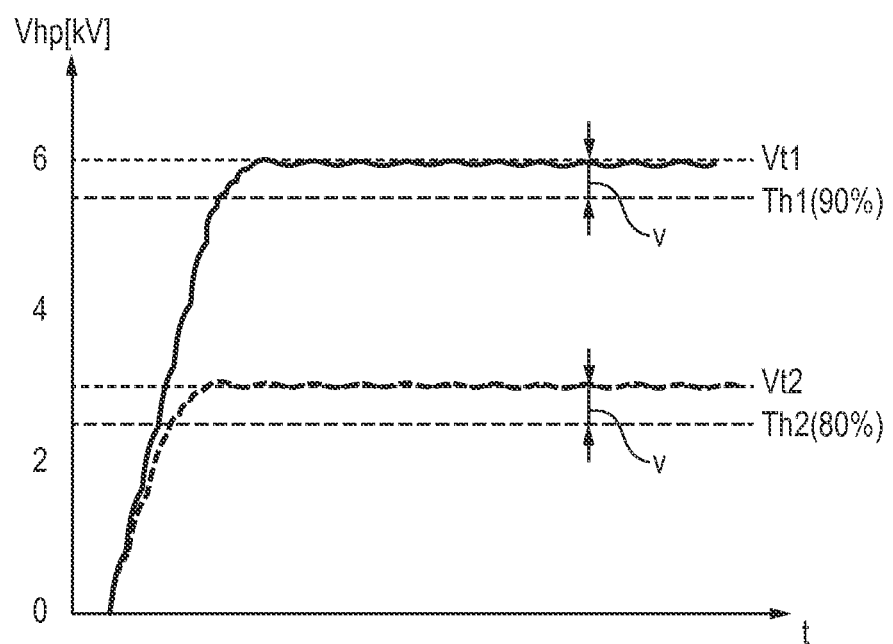
FIG. 13 is a diagram showing a relationship between a rising waveform of an output voltage, a target value, and a threshold value.

As shown in FIG. 13, the threshold value setting unit 11 increases the ratio of the threshold value Th with respect to the target value Vt if the target value Vt is high (Th1=Vt1−v). In other words, Th1=0.9·Vt1. On the other hand, if the target value Vt is relatively small, the threshold value setting unit 11 decreases the ratio of the threshold Th with respect to the target value Vt (Th2=Vt2−v). In other words, Th2=0.8·Vt2. This is because it is easier to raise the output performance of the step-up transformer 1 in the case where a low voltage is output than in the case where a high voltage is output. This tends to incur overshooting. In view of this, the threshold value determining method is used, and thus if the target value Vt is low, the ratio between the target value Vt and the difference v is decreased and switching is performed from the switching control region to the supply voltage control region at an earlier time. As a result, the region in which supply voltage control is applied is relatively larger with respect to the region in which switching control is applied, and it is easier to reduce the occurrence of overshooting. On the other hand, if the target value Vt is high, the ratio between the target value Vt and the difference v is increased, and switching is performed from the switching control region to the supply voltage control region at a later time. In other words, the region in which supply voltage control is applied is relatively smaller with respect to the region in which switching control is applied, and high-speed raising is possible.

In step S1201, the controller 300 (setting value determining unit 15) determines the setting value V1set based on the environment condition (e.g., temperature or humidity) sensed by the environment sensor 5 or information derived therefrom (e.g., the target value or threshold value). For example, the controller 300 (setting value determining unit 15) determines the initial setting value V1set0 based on the environment condition and sets it in the supply voltage control unit 12. For example, the setting value determining unit 15 uses a table or an equation to determine the initial setting value V1set0 based on the environment condition, the target value Vt, or the threshold value Th. The supply voltage control unit 12 controls the voltage supply circuit 3 such that an initial supply voltage V1a for determining the impedance of the load 8 is applied to the step-up transformer 1. When the initial supply voltage Via is applied to the primary side of the step-up transformer 1, the current Ihp flows in the load 8 that is connected to the secondary side. This is detected by the current detection circuit 7 and is reported to the setting value determining unit 15. The setting value determining unit 15 may obtain the impedance of the load 8 based on the detected current Ihp. The setting value determining unit 15 determines the setting value V1set based on the current Ihp or the impedance. The setting value V1set is determined based on the target value Vt and the current Ihp (impedance of the load 8) for example. This determining method may be expressed in advance as a formula.

If the supply voltage V1, the target value Vt, and the switching control frequency of the step-up transformer 1 do not change, the voltage applied to the load 8 will increase as the load 8 increases (as the impedance decreases). Conversely, as the load 8 decreases (as impedance increases), the voltage applied to the load 8 decreases. In view of this, in the case where the load 8 has increased as well, it is necessary to adjust the supply voltage V1 in order to obtain a voltage characteristic for the step-up transformer 1 that is similar to that in the case where the load 8 is low. For example, the setting value determining unit 15 sets the supply voltage V1 to be higher in the case where the load 8 is heavy, and the supply voltage V1 is set to be lower in the case where the load 8 is light. According to this, if the load 8 is heavy, the amount of current that flows on the primary side of the step-up transformer 1 increases (power on the primary side of the step-up transformer 1 increases). As a result, an output characteristic of the step-up transformer 1 that is similar to that in the case where the load 8 is light and the supply voltage V1 is low is obtained.

In this way, according to Embodiment 3, first, the target value Vt and the threshold value Th are determined according to the environment condition. The setting value V1set for the supply voltage V1 is determined according to the detection result of the load 8 in advance of the startup of the step-up transformer 1. Furthermore, switching control is executed until the output voltage Vhp reaches the threshold value Th. After the output voltage Vhp reaches the threshold value Th, supply voltage control is executed. According to this, it is possible to achieve both high-speed raising and stability for the output voltage Vhp. Furthermore, by adjusting the supply voltage V1 with consideration given to variation in the impedance of the load 8, the output characteristic of the step-up transformer 1 can be maintained.

Variations

In the above-described Embodiments 1 to 3, the switching control unit 13 drives the step-up transformer 1 by controlling the frequency or the duty ratio of the switching control signal while the off time thereof is fixed. However, the switching control signal that can be applied in the present invention is not limited to the above-described examples, and it is possible to use a signal with a variable duty ratio (duty ratio control signal), and it is possible to use a signal with a variable frequency whose off time is not fixed (frequency control signal). Regarding the frequency control signal, the switching control unit 13 causes the output voltage Vhp to increase by sweeping the frequency from a high frequency to a low frequency, or from a low frequency to a high frequency. Also, the supply voltage control unit 12 may variably control the supply voltage V1 by supplying the supply voltage signal, which has been subjected to pulse width modulation according to the setting value V1set, to the voltage supply circuit 3.

Note that in Embodiment 1 to Embodiment 3, the threshold value Th1 is described as being one fixed value, but it is possible to use multiple threshold values Th. For example, the threshold value setting unit 11 may set a first threshold value Th1 that is lower than the target value Vt and a second threshold value Th2 that is higher than the target value Vt in the comparison unit 14. If the result of comparison by the comparison unit 14 indicates that the output voltage Vhp is less than or equal to the first threshold value Th1, the controller 300 employs switching control. Similarly, if the result of comparison by the comparison unit 14 indicates that the output voltage Vhp is greater than or equal to the threshold value Th2, the controller 300 employs switching control. On the other hand, if the result of comparison performed by the comparison unit 14 indicates that the output voltage Vhp is between the first threshold value Th1 and the second threshold value Th2, the controller 300 employs supply voltage control. If a large load variation is generated, sometimes the output voltage Vhp significantly diverges from the target value Vt. In such a case, the controller 300 can return the output voltage Vhp to the target value Vt at a high speed using switching control by which the output voltage changes dramatically. In this way, when the output voltage Vhp exceeds the second threshold value Th2 that is larger than the first threshold value Th1 and the target value Vt, the controller 300 functions as a control unit that switches from supply voltage control to switching control.

Also, Embodiments 1 to 3 described operations in the case of outputting a positive voltage, but the present invention is applicable also in the case of outputting a negative voltage. Note that in the case of a negative voltage, the above-described threshold value (voltage value) Th1 is a value that is larger than the target value (voltage value) Vt, and in terms of absolute value, the threshold value Th1 is smaller than the target value Vt. Note that in the case of a negative voltage as well, multiple threshold values Th may be set as described above.

The above-described voltage generating apparatus 100 can be used in various electronic devices, and for example, it can be applied as a high-voltage power source apparatus in an electrophotographic image forming apparatus. FIG. 14 is a diagram showing an example of an electrophotographic multi-color image forming apparatus. A multi-color image forming apparatus 110 is a tandem color laser beam printer that outputs multi-color images by overlaying four colors of toner, namely yellow (Y), magenta (M), cyan (C), and black (K).

A photosensitive member 113 rotates in the direction of the arrow in the figure and is uniformly charged with a voltage by a charging roller 116 to which a charging voltage has been applied from the high-voltage power source unit 200. An electrostatic latent image is formed on the surface of the photosensitive member 113 by an exposure apparatus 111. A developing voltage is applied from the high-voltage power source unit 200 to a developing roller 115, and the electrostatic latent image is developed. The developing roller 115 is an example of a developing unit that develops an electrostatic latent image into a toner image. Also, the high-voltage power source unit 200 functions as an application unit that applies a development voltage to the developing roller 115. A primary transfer voltage is applied from the high-voltage power source unit 200 to a primary transfer roller 118. According to this, the toner image undergoes primary transfer from the photosensitive member 113 onto an intermediate transfer member 119. An image with four colors of toner, namely yellow (Y), magenta (M), cyan (C), and black (K), undergoes multi-layer transfer onto the intermediate transfer member 119.

A recording sheet 121 stored in a cassette 122 is sent to a conveyance path by a paper supply roller 123. The recording sheet 121 is conveyed to a secondary transfer nip unit by a pair of conveyance rollers 125 and a pair of resist rollers 126. A secondary transfer voltage is applied from the high-voltage power source unit 200 to a secondary transfer roller 128 that is installed at the secondary transfer nip unit. The toner image is transferred from the intermediate transfer member 119 onto the recording sheet 121 by the secondary transfer roller 128. The toner image is heat-fixed to the recording sheet 121 by a fixer 129.

By employing the above-described voltage generating apparatus 100 in the image forming apparatus 110, the FPOT of the image forming apparatus 110 can be shortened. FPOT is an abbreviation for First Print-Out Time, and it refers to the amount of waiting time needed from when the image forming apparatus 110 is started, until when the first image is output. In particular, the FPOT of the image forming apparatus 110 can be shortened since the output voltage Vhp can be raised at a high speed using switching control. Furthermore, since the output voltage Vhp can be stabilized, image defects and the like that are caused by the output voltage being unstable for example can be reduced.

Embodiment 4

In general, with an image forming apparatus, sometimes positive and negative voltages are applied alternatingly as the transfer voltage. That is to say, the transfer voltage changes from a positive voltage to a negative voltage, to a positive voltage, to a negative voltage, and so on. For example, a positive voltage is used for transferring toner, and a negative voltage is used for cleaning residual toner after transfer. Here, with a focus on the positive voltage, the positive voltage is raised to the target voltage, is subsequently lowered, and after resting for a certain amount of time, the positive voltage is once again raised to the target voltage. There is market desire for shortening the overall amount of time for raising the output voltage when repeatedly raising the output voltage in this way. In view of this, it is an object of the present invention to shorten the overall amount of time for raising the output voltage when the output voltage is repeatedly raised.

Until the output voltage reaches a threshold value that is smaller than a target value, the voltage generating apparatus of the present embodiment uses switching control to raise the output voltage and subsequently uses supply voltage control to bring the output voltage closer to the target value while maintaining the state of the switching control signal at the time when the output voltage reached the threshold value. In other words, the occurrence of overshooting and undershooting is reduced by using switching control to raise the output voltage at a high speed and using supply voltage control near the target value to stably control the output voltage so as to be at the target value. Furthermore, the voltage generating apparatus has a storage unit that stores a parameter that characterizes the switching control signal at the time when the output voltage reached the threshold value. When the output voltage is to again be controlled so as to be at the target value after the output thereof has been stopped due to reaching the target value, the voltage generating apparatus reads out the parameter from the storage unit. Furthermore, the voltage generating apparatus controls the signal generation unit such that a switching control signal that corresponds to the parameter is output. In this way, the amount of time for adjusting the output voltage can be shortened by storing the parameter characterizing the switching control signal adjusted in the n-th instance of raising the output voltage and reading out the parameter in the (n+1)-th instance of raising the output voltage.

Figure 15:
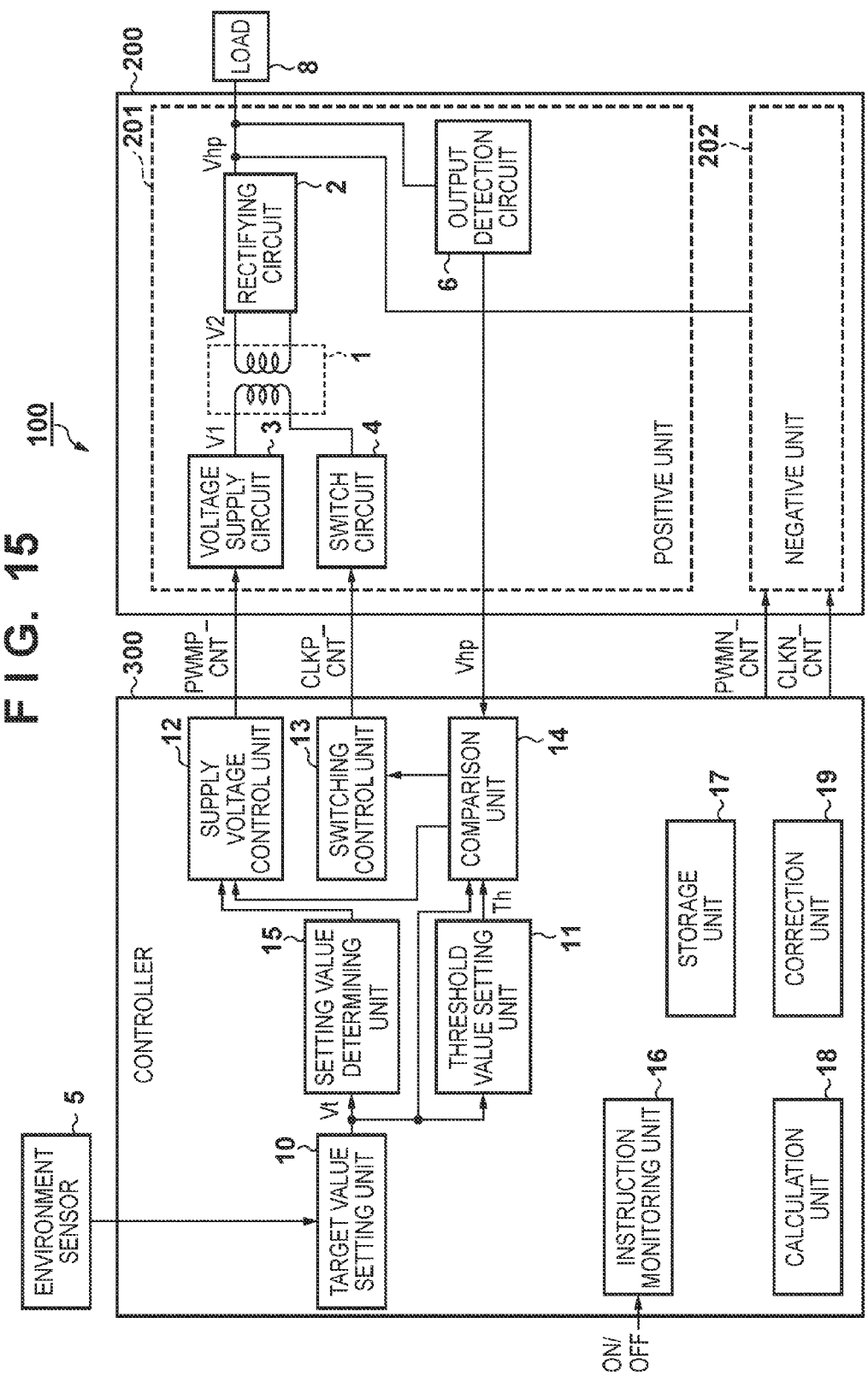
FIG. 15 is a functional block diagram of the voltage generating apparatus.
Figure 16:
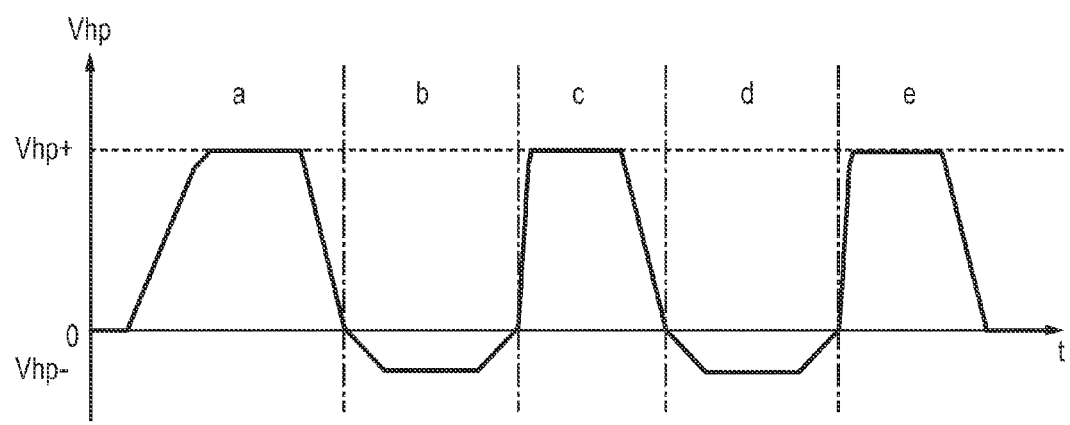
FIG. 16 is a diagram showing an example of switching an output voltage.

FIG. 15 is a block diagram showing the high-voltage power source unit 200 and the controller 300 that constitute the voltage generating apparatus 100. The high-voltage power source unit 200 has a positive unit 201 that outputs a positive DC voltage and a negative unit 202 that outputs a negative DC voltage. As shown in FIG. 16, the high-voltage power source unit 200 sometimes outputs a positive DC voltage Vhp+ and a negative DC voltage Vhp− alternatingly as the output voltage Vhp that is to be applied to the load 8. In FIG. 16, the positive unit 201 supplies the positive DC voltage Vhp+ to the load 8 in segments a, c, and e. Also, the negative unit 202 supplies the negative DC voltage Vhp− to the load 8 in segments b and d. In particular, in Embodiment 4, the control parameter that is needed in the first instance of raising the DC voltage Vhp+ in segment a is stored in a storage unit 17. Also, in the second instance of raising the DC voltage Vhp+ in segment c, the control parameter is read out from the storage unit 17 and used. Accordingly, the amount of time for adjusting the control parameter can be shortened in the second instance. Note that the positive unit 201 and the negative unit 202 have configurations that are approximately the same apart from the fact that the polarities of the output voltages are different, and therefore a description focusing on the positive unit 201 will be given hereinafter in place of the description of the negative unit 202.

In FIG. 15, the voltage supply circuit 3 is an example of a voltage supply circuit that generates a supply voltage V1 for the primary side of a step-up transformer 1. For example, the voltage supply circuit 3 generates the supply voltage V1 in accordance with the supply voltage signal (hereinafter referred to as "PWMP_CNT") from the controller 300 and applies it to the primary side of the step-up transformer 1. Note that when the controller 300 uses the negative unit 202, a supply voltage signal (hereinafter referred to as "PWMN_CNT") is output with respect to the negative unit 202 as well. The switch circuit 4 is a circuit for driving the step-up transformer 1 in accordance with the switching control signal (hereinafter referred to as "CLKP_CNT") from the controller 300. Note that when the controller 300 uses the negative unit 202, a switching control signal (hereinafter referred to as "CLKN_CNT") is output with respect to the negative unit 202 as well. The step-up transformer 1 is a voltage conversion module that steps up a primary-side voltage (supply voltage V1) supplied from the voltage supply circuit 3 to a secondary-side voltage V2. The rectifying circuit 2 is a circuit that is connected to the secondary side of the step-up transformer 1, rectifies the secondary-side voltage V2 that is output from the secondary winding of the step-up transformer 1, and generates the DC output voltage Vhp. The output detection circuit 6 is a circuit for detecting the rectified output voltage Vhp from the step-up transformer 1. The load 8 is a load that is connected to the output end of the high-voltage power source unit 200 and receives the output voltage Vhp.

The environment sensor 5 is a sensor for sensing an environment condition (e.g., amount of moisture, humidity, or temperature). The controller 300 is an example of a control unit for controlling the switch circuit 4 and the voltage supply circuit 3. The controller 300 has a port for outputting PWMP_CNT, a port for outputting CLKP_CNT, and an input port for receiving input of a voltage (referred to as "output voltage Vhp" for the sake of convenience) that is proportional to the output voltage Vhp. The controller 300 generates PWMP_CNT and CLKP_CNT based on the sensing result of the environment sensor 5 and the detection result of the output detection circuit 6 and controls the voltage supply circuit 3 and the switch circuit 4. Note that the output detection circuit 6 is an example of a voltage detection circuit for detecting the output voltage Vhp on the secondary side of the step-up transformer 1.

The controller 300 includes a CPU, a ROM, and a RAM and realizes various functions by executing programs stored in the ROM. The target value setting unit 10 functions as a target value determining unit for determining the target value Vt based on the environment condition sensed by the environment sensor 5. In other words, the target value setting unit 10 determines the target value Vt for the output voltage Vhp of the step-up transformer 1 based on the sensing result of the environment sensor 5. The threshold value setting unit 11 functions as a threshold value determining unit that determines a threshold value Th according to one of the following: the sensing result of the environment sensor 5, the target value Vt of the step-up transformer 1, and the impedance of the load 8, for example. The setting value determining unit 15 determines the setting value V1set for the supply voltage V1 according to the sensing result of the environment sensor 5, the target value Vt, or the threshold value Th and sets it in a supply voltage control unit 12. Note that the setting value V1set is the initial value of the supply voltage V1, and the setting value V1set is adjusted when the output voltage Vhp is controlled. The adjustment amount for the setting value V1set will be referred to as "adjustment amount ΔV1set". Note that the setting value V1set need not be a voltage value, and it may be the PWN value (duty ratio) of PWMP_CNT. Since PWMP_CNT is a pulse wave resulting from pulse width modulation, the output voltage Vhp is adjusted by changing the PWM value. The supply voltage control unit 12 generates the supply voltage signal PWMP_CNT according to the setting value V1set that was set by the setting value determining unit 15 and supplies the supply voltage signal to the voltage supply circuit 3. The setting value determining unit 15 is an example of a setting value determining unit that determines the setting value V1set for the supply voltage V1 from the voltage supply circuit 3. The switching control unit 13 is an example of a signal generation unit that generates a switching control signal for driving a switch circuit. The switching control unit 13 generates CLKP_CNT according to the result of comparing the threshold value Th and the output voltage Vhp in the comparison unit 14 for example and supplies CLKP_CNT to the switch circuit 4. The comparison unit 14 is an example of a comparison unit for comparing the output voltage Vhp and the threshold value Th that is smaller than the target value Vt for the output voltage Vhp. The instruction monitoring unit 16 monitors whether or not a startup instruction to start up the high-voltage power source unit 200 has been received from a superordinate controller. Note that the startup instruction is a command that instructs the start of outputting the output voltage Vhp.

A calculation unit 18 and a correction unit 19 are optional and will be described in detail in Embodiment 6. For example, using an arithmetic operation, the calculation unit 18 obtains the correlation relationship between the first target value Vt and the parameter at the time when the output voltage Vhp is being maintained at the first target value Vt. Also, when the target value for the output voltage Vhp is changed from the first target value Vt to a second target value Vt', the correction unit 19 corrects the parameter based on the correlation relationship and the second target value Vt'. According to this, the parameter stored in the storage unit 17 is updated.

Operations of the voltage generating apparatus 100 will be described next with reference to FIGS. 2, 3, and 17. FIG. 2 is a flowchart showing the steps of a program executed by the CPU included in the controller 300. In particular, FIG. 2 shows processing for the first instance of raising the output voltage Vhp. The CPU functions as the above-described units by executing a program stored in the ROM. FIG. 3 is a diagram for describing the relationship between the output voltage Vhp and the supply voltage V1 and the switching of control. In Embodiment 4, as shown in FIG. 3, the region corresponding to the time after when the high-voltage power source unit 200 is started up until the time when the output voltage Vhp reaches the threshold value Th will be referred to as "switching control region". Also, the control region from the time when the output voltage Vhp reaches the threshold value Th will be referred to as "supply voltage control region". In particular, in Embodiment 4, when the comparison unit 14 detects that the output voltage Vhp has reached the threshold value Vt, the controller 300 transitions from the switching control region to the supply voltage control region. The switching control region is a region in which the output voltage Vhp is raised at a high speed (high-speed raising region), and the supply voltage control region is a region for accurately and stably controlling the output voltage Vhp so as to be at the target value Vt. Note that the supply voltage control region is furthermore divided into a region for raising the output voltage Vhp from the threshold value Th to the target value Vt (stable raising region), and a region for maintaining the output voltage Vhp at the target value Vt (constant voltage control region). A control parameter that characterizes PWMP_CNT and CLKP_CNT in the constant voltage control region (e.g., adjustment value, PWM value, duty ratio, frequency, period, or the like) are stored in the storage region 17 and are read out and used in the second and subsequent instances of raising.

Steps S201 to S204 are as described above.

In step S205, the controller 300 (instruction monitoring unit 16) determines whether or not a startup instruction to start up the high-voltage power source unit 200 has been received from a superordinate controller performs control of the controller 300. For example, the instruction monitoring unit 16 receives an instruction to start outputting the positive DC voltage Vhp+ (an instruction to start up the positive unit 201). When a startup instruction is received, the procedure moves to step S206. In step S206, the controller 300 generates CLKP_CNT and supplies it to the switch circuit 4 so as to drive the switch circuit 4 and cause the step-up transformer 1 to start outputting the output voltage Vhp. Steps S207 to S209 are as described above.

In step S210, the controller 300 (supply voltage control unit 12) starts supply voltage control for the output voltage Vhp. For example, the controller 300 causes the comparison unit 14 to compare the output voltage Vhp and target value Vt and adjusts PWMP_CNT according to the comparison result such that the output voltage Vhp is brought closer to the target value Vt. PWMP_CNT is a supply voltage signal that has been subjected to pulse width modulation according to the setting value V1set. Accordingly, the pulse width (PWM value) of PWMP_CNT is adjusted according to the comparison result. Note that the pulse width is changed by adjusting V1set. The voltage supply circuit 3 variably controls the supply voltage V1 according to the changed PWMP_CNT. Thus, with supply voltage control, the output voltage Vhp is adjusted by adjusting the supply voltage V1. As shown in FIG. 16, the frequency of CLKP_CNT is fixed and the supply voltage V1 is adjusted, and thereby the output voltage Vhp starts to change more slowly and overshooting and hunting are less likely to occur. When the output voltage Vhp reaches the target value Vt, the procedure moves to step S211.

In step S211, the controller 300 (supply voltage control unit 12) executes constant voltage control using PWMP_CNT such that the output voltage Vhp is maintained at the target value Vt. In other words, the above-described constant voltage control is realized using the supply voltage control method. Thus, in steps S210 and S211, the supply voltage control unit 12 adjusts the setting value V1set for PWMP_CNT according to the result of comparison performed by the comparison unit 14, such that the output voltage Vhp is brought closer to the target value Vt. For example, the supply voltage control unit 12 determines an adjusted setting value V1set' by adjusting the initial setting value V1set by a fine adjustment value ΔV1set (V1set'=V1set+ΔV1set). The initial setting value V1set is finely adjusted N times by a small amount Δ each time (ΔV1set=N·Δ).

In step S212, the controller 300 (instruction monitoring unit 16) determines whether or not a termination instruction has been received from a superordinate controller. When a termination instruction is received, the output of the output voltage Vhp pertaining to the first instance is stopped. Here, the procedure moves to step S501 in FIG. 17.

Figure 17:
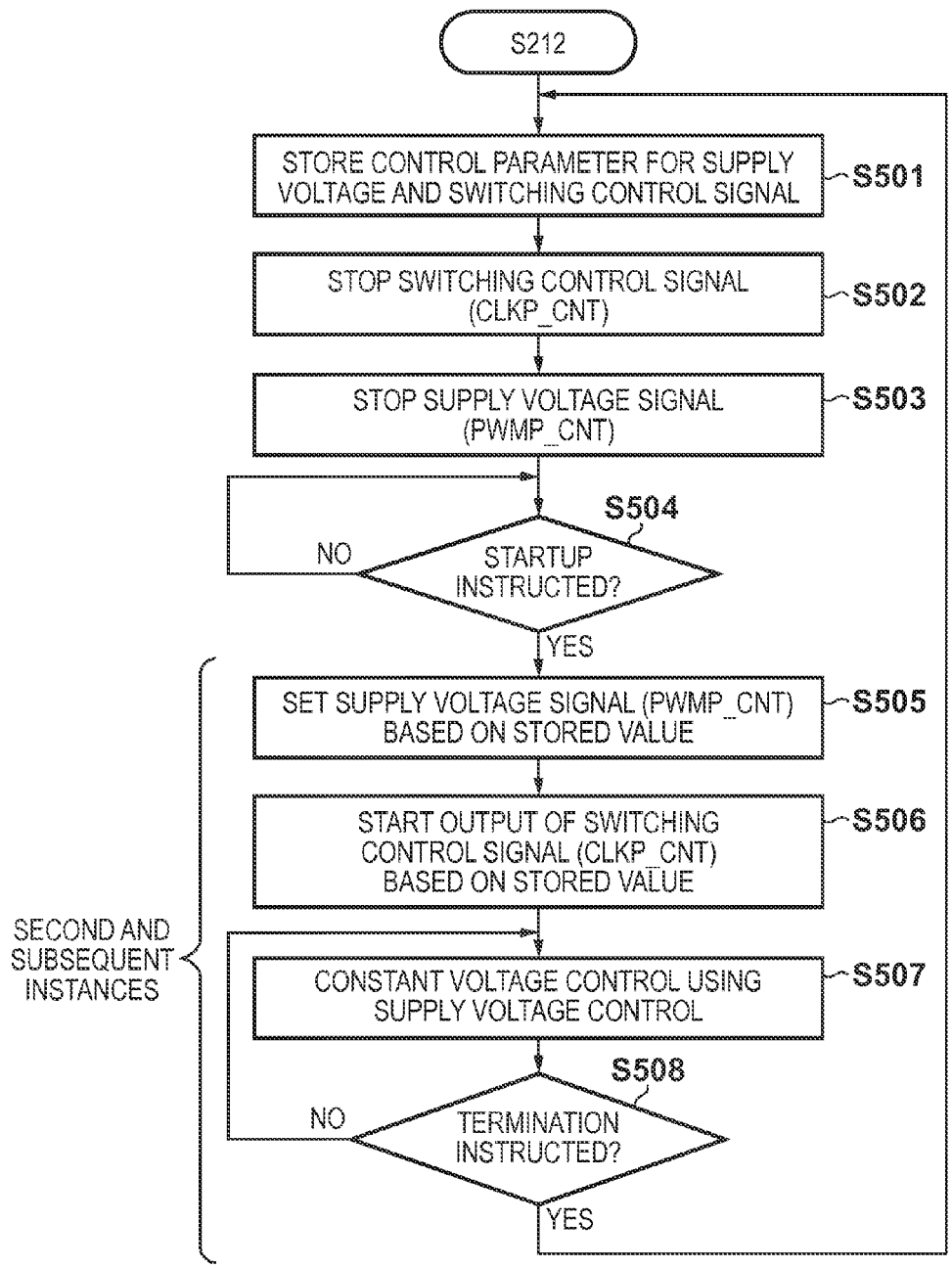
FIG. 17 is a flowchart showing an example of a method for controlling the voltage generating apparatus.

FIG. 17 is a flowchart showing operations executed by the controller 300 in order to raise the output voltage Vhp in the second and subsequent instances. As described with reference to FIG. 16, the operation is an operation for raising the output voltage Vhp in segments c and e. Upon the positive DC voltage Vhp+ being raised in segment a, the output of the positive DC voltage Vhp+ is stopped in segment b, and the negative DC voltage Vhp− is raised. Furthermore, in segment c, the positive DC voltage Vhp+ is once again raised. Since the control parameters for PWMP_CNT and CLKP_CNT are determined according to the first instance of raising, it is sufficient that those control parameters are finely adjusted in the second instance of raising. In particular, in the case where the time interval between the first instance and the second instance is short, variation in the environment and changes in parts are also small, and therefore the amount of adjustment for the control parameters will also be small.

In step S501, the controller 300 stores the control parameters for PWMP_CNT and CLKP_CNT in the storage unit 17. According to this, the control parameter for PWMP_CNT (e.g., the adjusted setting value V1set' or the fine adjustment value ΔV1set) and the control parameter for CLKP_CNT (e.g., the adjusted frequency, the off time, the duty ratio, the adjustment values thereof, or the like) that were determined according to the first instance of raising are held in the storage unit 17.

In step S502, the controller 300 (switching control unit 13) stops the output of CLKP_CNT. When the output of CLKP_CNT is stopped, the switch circuit 4 can no longer drive the step-up transformer 1, and therefore the step-up transformer 1 can no longer output the secondary-side voltage V2 and the output of the output voltage Vhp stops.

In step S503, the controller 300 (supply voltage control unit 12) stops the output of PWMP_CNT. In step S504, the controller 300 (instruction monitoring unit 16) determines whether or not a startup instruction to start up the high-voltage power source unit 200 has been received from a superordinate controller that performs control of the controller 300. For example, the instruction monitoring unit 16 receives an instruction to start the second and subsequent instances of outputting the positive DC voltage Vhp+ (an instruction to start up the positive unit 201). When a startup instruction is received, the procedure moves to step S505. According to this, the second and subsequent instances of raising the positive DC voltage Vhp+ are started.

In step S505, the controller 300 (supply voltage control unit 12) reads out the control parameter stored in the storage unit 17 (stored value) so as to generate and output PWMP_CNT in accordance with the control parameter. The control parameter may be the setting value V1set and the adjustment value Δv1set, and the control parameter may be the adjusted setting value V1set' that is obtained by applying the adjustment value Δv1set to the setting value V1set. When the supply voltage control unit 12 outputs PWMP_CNT corresponding to the setting value V1set', the voltage supply circuit 3 generates and outputs the supply voltage V1 corresponding to the setting value V1set'. According to this, the supply voltage V1 that was used when the output voltage Vhp was subjected to constant voltage control for the first time is applied to the primary side of the step-up transformer 1.

In step S506, the controller 300 (switching control unit 13) reads out the control parameter stored in the storage unit 17 (stored value) so as to generate and output CLKP_CNT in accordance with the control parameter. The control parameter is, for example, the frequency or the duty ratio D. The off time τoff may also be read out from the storage unit 17. The switching control unit 13 outputs CLKP_CNT having the frequency that was ultimately used in the first instance, and thereby the switch circuit 4 drives the step-up transformer 1 according to CLKP_CNT. According to this, the output voltage Vhp is raised to a value that is extremely close to the target voltage Vt. Thus, when the output voltage Vhp is to again be controlled so as to be at the target value after the output thereof has been stopped due to reaching the target value Vt, the controller 300 reads out the parameter from the storage unit 17 and controls the switching control unit 13 such that a switching control signal corresponding to the parameter is output.

In step S507, the controller 300 (supply voltage control unit 12) executes constant voltage control using PWMP_CNT such that the output voltage Vhp is maintained at the target value Vt. In other words, the above-described constant voltage control is realized using a supply voltage control method.

In step S508, the controller 300 (instruction monitoring unit 16) determines whether or not a termination instruction has been received from a superordinate controller. When a termination instruction is received, the output of the output voltage Vhp pertaining to the second instance is stopped. Here, the procedure returns to step S501 in FIG. 17.

Upon comparing the operation for the first instance of raising shown in FIG. 2 and the operation for the second instance of raising shown in FIG. 17, it can be understood that the number of steps has been significantly reduced. In other words, since the fine adjustment for the frequency of the switching control signal and setting value of the supply voltage signal is completed according to the first instance of raising, the amount of fine adjustment processing can be reduced in the second instance of raising. According to this, the amount of time for raising is significantly shortened between the operations for the first instance of raising and the operations for the second instance of raising shown in FIG. 17.

Figure 18:
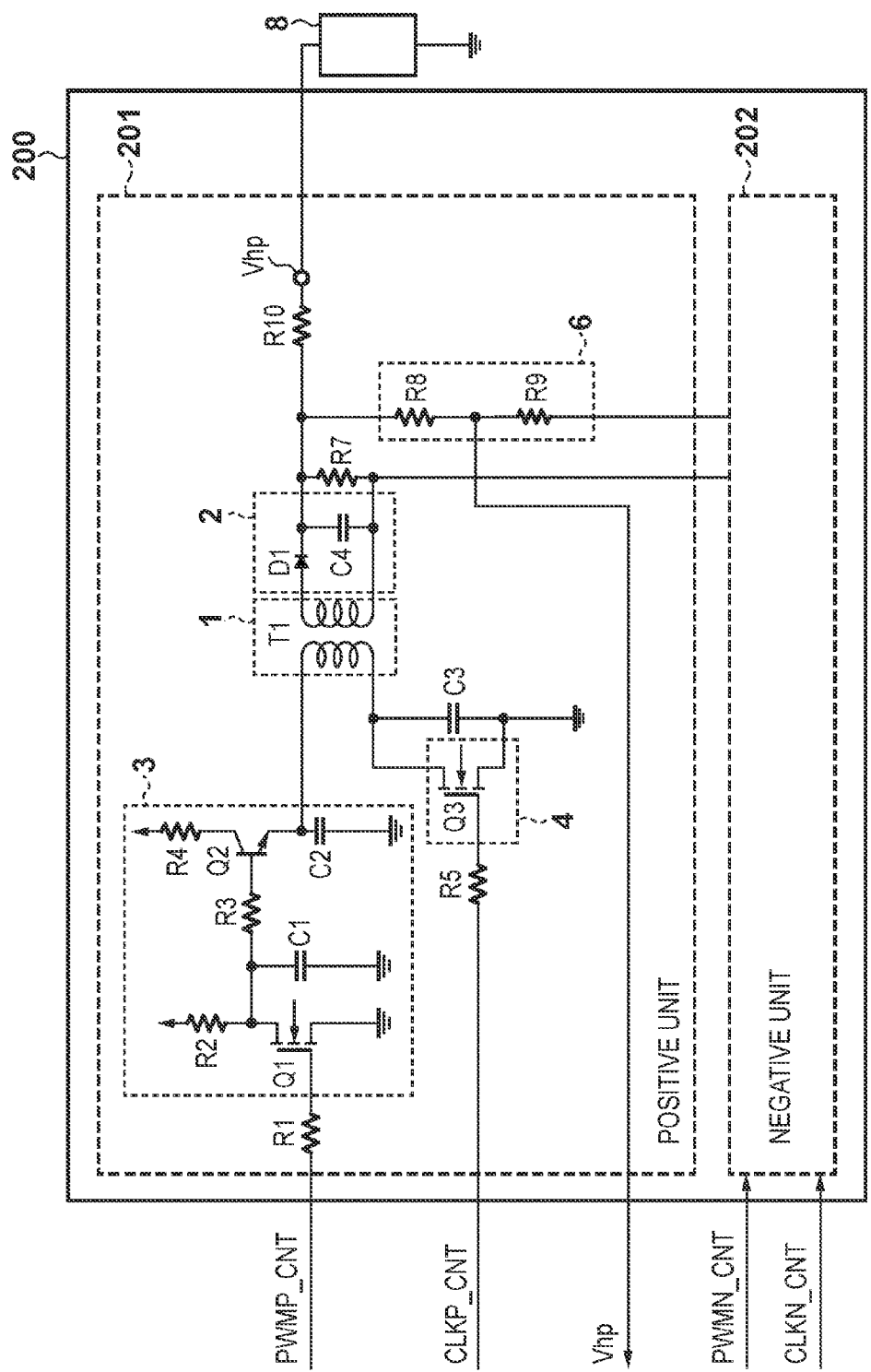
FIG. 18 is a circuit diagram of the voltage generating apparatus.

FIG. 18 is a circuit diagram showing an example of circuits constituting the units of the high-voltage power source unit 200. PWMP_CNT is input via the protective resistor R1 to the control terminal of a field effect transistor (FET) Q1 of the voltage supply circuit 3. The current outflow terminal of the FET Q1 is connected to a power source Vcc via the resistor R2. The current input terminal of the FET Q1 is grounded. The current output terminal of the FET Q1 is furthermore connected to one end of the capacitor C1 and one end of the resistor R3. The other end of the capacitor C1 is grounded. The other end of the resistor R3 is connected to the base of the transistor Q2. The collector of the transistor Q2 is connected to a power source through the resistor R4. The emitter of the transistor Q2 is grounded via the capacitor C2. Furthermore, the emitter of the transistor Q2 is connected to one end of the primary winding of the transformer T1. Using PWMP_CNT, the FET Q1 is driven and the transistor Q2 is furthermore controlled. According to this, a predetermined voltage (supply voltage V1) is applied to the capacitor C2. The voltage between the two ends of the capacitor C2 (charge voltage) is applied to the primary side of the transformer T1 that configures the step-up transformer 1.

The switch circuit 4 is constituted by the FET Q3. CLKP_CNT is applied to the control terminal of the FET Q3 via the protective resistor R5. The current output terminal of the FET Q3 is connected to the other end of the primary winding of the transformer T1. The capacitor C3 is provided between the current output terminal and the current input terminal of the FET Q3. The step-up transformer 1 and the capacitor C3 form a resonance circuit.

The rectifying circuit 2 is constituted by the diode D1 and the capacitor C4. The anode of the diode D1 is connected to one end of the secondary winding of the transformer T1. The cathode of the diode D1 is connected to one end of the capacitor C4, one end of the resistor R7, one end of the resistor R8, and one end of the resistor R10. The other end of the capacitor C4 is connected to the other end of the secondary winding of the transformer T1 and grounded. The other end of the resistor R7 is also grounded. Thus, the secondary-side voltage V2 of the step-up transformer 1 is rectified by the diode D1 and smoothed by the capacitor C4 and thus becomes the output voltage Vhp. The output voltage Vhp, which is a DC voltage, is applied to the load 8. The output detection circuit 6 is a voltage-dividing circuit (voltage detecting circuit) that divides the output voltage Vhp using the resistance ratio between the resistor R8 and the resistor R9. A voltage that is proportional to the output voltage Vhp is input to the controller 300.

Advantages of Switching Control

Detailed operations of Embodiment 4 will be described below with reference to FIGS. 18, 5, and 6. PWMP_CNT is a type of pulse signal. The supply voltage control unit 12 generates PWMP_CNT using a duty ratio that corresponds to the setting value V1set, and performs driving by supplying the generated PWMP_CNT to the voltage supply circuit 3. As shown in FIG. 18, the capacitor C2 in the voltage supply circuit 3 is charged, and the voltage between the two ends of the capacitor C2 is applied to the primary side of the step-up transformer 1 as the supply voltage V1. The capacitor C2 is connected parallel to the primary side of the step-up transformer 1.

Incidentally, the output voltage Vhp of the step-up transformer 1 can be controlled by adjusting the setting value V1set of the voltage supply circuit 3. In the control of the output voltage Vhp performed by the voltage supply circuit 3 (supply voltage control), the driving for switching the step-up transformer 1 and the supply of voltage to the primary side of the step-up transformer 1 are performed in parallel. For this reason, there is a problem in that the amount of time for raising the output voltage Vhp becomes longer according to the amount of time for charging the capacitor C2.

On the other hand, in the present embodiment, the capacitor C2 is pre-charged to a desired voltage (V1set), and the switch circuit 4 subsequently raises the output voltage of the step-up transformer 1 at a high speed. According to this, the output voltage Vhp of the step-up transformer 1 can be raised at a higher speed.

FIG. 5 is a diagram showing the amount of time for raising using supply voltage control and the amount of time for raising using switching control. With supply voltage control, the switch circuit 4 is driven so as to be constant, and the output voltage Vhp of the step-up transformer 1 is adjusted by adjusting the setting value V1set of the voltage supply circuit 3. With switching control, the setting value V1set of the step-up transformer 1 is kept constant and the output voltage Vhp is adjusted under the control of the switch circuit 4.

As shown in FIG. 5, with supply voltage control, the output voltage Vhp of the step-up transformer 1 is raised more slowly than with switching control. This is because the amount of time for raising in supply voltage control depends on the amount of time for charging the capacitor C2. On the other hand, with switching control, the output voltage Vhp is controlled using only driving for switching in a state in which the capacitor C2 is pre-charged. For this reason, the amount of time for raising does not depend on the amount of time for charging the capacitor C2.

Here, in the present embodiment, switching control is employed for high-speed raising of the output voltage Vhp. In particular, before the arrival of a startup instruction from the superordinate controller (YES in step S205), the controller 300 determines the setting value V1set, supplies PWMP_CNT to the voltage supply circuit 3, and thus pre-charges the capacitor C2. As shown in FIG. 16, the capacitor C2 is pre-charged and the supply voltage V1 is maintained at the setting value V1set.

Incidentally, the setting value V1set is determined according to the output characteristic of the step-up transformer 1. FIG. 6 shows examples of the output voltage Vhp at the time when the off time $\tau$off of CLKP_CNT is fixed at a certain constant value and subjected to frequency modulation driving. CLKP_CNT is a pulse signal whose off time can be controlled, and to which frequency modulation can be applied. As shown in FIG. 6, the output voltage Vhp varies according to the supply voltage V1 (setting value V1set) and the frequency of CLKP_CNT. With a step-up transformer 1 having such characteristics, sometimes the upper limit value of the output voltage Vhp that can be output using a certain setting value V1set is lower than the target value Vt. For example, if the setting value V1set is set to 1 V, Vhp cannot be set to 3 kV. In this case, if the setting value V1set is set to 8 V, and the frequency of CLKP_CNT is set to 60 kHz or higher, Vhp can be set to 3 kV. Note that the above-described table or equation for determining the setting value V1set is determined with consideration given to the output characteristics of the step-up transformer 1.

Advantages of Supply Voltage Control

In Embodiment 4, due to the controller 300 (control method switching unit) switching between switching control and supply voltage control, high-speed raising of the output voltage Vhp and stabilization of the output voltage Vhp are achieved. Since the advantages of switching control have been described above, the advantages of supply voltage control will be described here.

Switching control is employed until the output voltage Vhp reaches the threshold value Th. With switching control, the off time of the pulse of CLKP_CNT is fixed at a certain value while the frequency is controlled, and thereby the switch circuit 4 is driven and power is supplied to the primary side of the step-up transformer 1.

To give a more specific description, the rectifying circuit 2 outputs a DC voltage (output voltage Vhp) by rectifying an AC secondary-side voltage V2 that was output to the secondary side of the step-up transformer 1. When the comparison unit 14 determines that the output voltage Vhp detected by the output detection circuit 6 has not yet reached the threshold value Th, the off time τoff of CLKP_CNT is fixed at a certain value, and the frequency of CLKP_CNT is swept from a high frequency to a low frequency by the switching control unit 13. According to this, the duty ratio for the driving for switching on the primary side of the step-up transformer 1 increases, and therefore the power supplied to the primary side of the step-up transformer 1 increases. The off time τoff for the pulse of the CLKP_CNT is set using the resonance circuit formed by the step-up transformer 1 and the capacitor C3. Accordingly, sufficient time is needed for the resonance voltage to be formed. With the step-up transformer 1 having the characteristics described in Embodiment 4, when the duty ratio is simply changed without the off time τoff being fixed (e.g., when the frequency is fixed and the duty ratio D is raised), sometimes the amount of forming time for the resonance voltage will be insufficient and the waveform of the resonance voltage will lose shape. As a result of this, the power on the primary side of the step-up transformer 1 will no longer be favorably converted to the secondary side. For this reason, the setting of the off time τoff is important.

When the comparison unit 14 detects that the output voltage Vhp has reached the threshold value Th, the switching control unit 13 switches the control method of the primary side from switching control to supply voltage control. The switching control unit 13 continues driving the switch circuit 4 with the frequency of CLKP_CNT fixed at the frequency f1 at the time when the output voltage Vhp reached the threshold value Th. Since the frequency f1 is fixed, the raising of the output voltage Vhp achieved using switching control is also stopped.

FIG. 7A is a diagram showing an example of changes in the output voltage Vhp in switching control. FIG. 7B is a diagram showing an example of changes in the output voltage Vhp in supply voltage control. As described above, with switching control, it is possible to raise the output voltage Vhp at a higher speed than with supply voltage control. On the other hand, with switching control, as shown in FIG. 7A, when the frequency is modulated, the output voltage Vhp varies widely. For this reason, ripples are larger in the constant voltage control region. On the other hand, as shown in FIG. 7B, ripples are small with supply voltage control. In view of this, by switching to supply voltage control at the time when the output voltage Vhp reaches the threshold value Th, the output voltage Vhp can be brought close to the target value Vt with accuracy and can be stably sustained there.

Incidentally, in the second and subsequent instances of raising the output voltage Vhp, the capacitor C2 is charged such that the voltage between the two ends of the capacitor C2 is a supply voltage that corresponds to the setting value stored in the storage unit 17. The charging of the capacitor C2 needs to be completed before the switch circuit 4 is driven using CLKP_CNT that corresponds to the control parameter stored in the storage unit 17. If the capacitor C2 is insufficiently charged, the output voltage Vhp cannot be raised at a high speed. For this reason, the supply voltage V1 is set using PWMP_CNT at a stage at which there is sufficient leeway with respect to the amount of time for charging the capacitor C2.

When successive images are formed with an image forming apparatus, high voltages are successively output. At this time, toner is cleaned from the transfer roller between sheets, and therefore the interval between the first and second instances of high-voltage raising is extremely short. Accordingly, changes in the environmental state are sufficiently small in the first and second instances, and there is no need to initialize the supply voltage V1 and the switching control frequency. Also, as a rule, the target value Vt for the output voltage Vhp is the same in the first and second instances. Accordingly, in the second and subsequent instances of raising, it is not necessary to sweep the frequency of CLKP_CNT (not necessary to perform coarse calibration of the output voltage Vhp). That is to say, the amount of time for frequency sweeping can be shortened. Also, fine adjustment of the output voltage Vhp according to the supply voltage V1 in the supply voltage control region is also not necessary, or it is merely necessary to a very slight extent.

According to Embodiment 4, the voltage generating apparatus 100 uses switching control to raise the output voltage Vhp until the output voltage Vhp reaches the threshold value Th that is smaller than the target value Vt. Thereafter, the voltage generating apparatus 100 uses supply voltage control to bring the output voltage Vhp closer to the target value Vt while the state of the switching control signal at the time when the output voltage Vhp reached the threshold value Th is maintained. That is to say, the voltage generating apparatus 100 uses switching control to raise the output voltage Vhp at a high speed, and uses supply voltage control near the target value Vt to stably control the output voltage Vhp at the target value Vt. According to this, it is possible to furthermore shorten the amount of time for raising the output voltage Vhp while reducing the occurrence of overshooting and undershooting of the output voltage Vhp.

Furthermore, the voltage generating apparatus 100 has a storage unit 17 that stores a parameter that characterizes the switching control signal at the time when the output voltage Vhp reached the threshold value Th. When the output voltage Vhp is to again be controlled so as to be at the target value Vt after the output thereof has been stopped due to reaching the target value Vt, the voltage generating apparatus 100 reads out the parameter from the storage unit 17. Furthermore, the voltage generating apparatus 100 controls a signal generation unit such that a switching control signal that corresponds to the parameter is output. In this way, the parameter characterizing the switching control signal that was adjusted in the n-th instance of raising the output voltage is stored, and the parameter is read out in the (n+1)-th and subsequent instances of raising the output voltage, and thereby the amount of time for adjusting the output voltage Vhp can be shortened. In particular, the amount of time for sweeping the frequency of the switching control signal can be shortened.

The storage unit 17 may store the fine adjustment value ΔV1set, which is the difference between the supply voltage V1 and the setting value V1set at the time when the output voltage Vhp is maintained at the target value Vt, or it may store the setting value V1set' that was adjusted by the control unit at the time of stopping the output of the output voltage Vhp. When the output voltage is to again be controlled so as to be at the target value after the output thereof has been stopped due to reaching the target value, the controller 300 uses the stored value. For example, the controller 300 may read out the fine adjustment value ΔV1set from the storage unit 17, control the voltage supply circuit 3 by applying the fine adjustment value ΔV1set to the setting value V1set, and cause a supply voltage V1' corresponding to the setting value V1set and the fine adjustment value ΔV1set to be generated. Similarly, the controller 300 may read out the adjusted setting value V1set' from the storage unit 17, control the voltage supply circuit 3 using the setting value V1set', and cause a supply voltage V1' corresponding to the setting value V1set' to be generated. According to this, the amount of time for adjusting the supply voltage V1 can be shortened.

As described with reference to FIG. 16, the polarity of the output voltage Vhp+ from the positive unit 201 is different from the polarity of the output voltage Vhp− from the negative unit 202, which is another voltage generating apparatus that drives the load alternatingly with the positive unit 201. This is because the positive output voltage Vhp+ is used for transferring toner, and the negative output voltage Vhp− is used for cleaning residual toner after transfer. The period in which the controller 300 stops the supply of the output voltage Vhp+ from the positive unit 201 is the period in which the negative unit 202 supplies the output voltage Vhp− to the load 8. This is because the transfer period and the cleaning period occur alternatingly. When the output voltage is raised repeatedly in this way, the present invention can shorten the overall amount of time for raising the output voltage. This is because the amount of time for the second and subsequent instances of raising the output voltage is shortened.

Embodiment 5

Embodiment 4 described a case of stopping the output voltage Vhp by stopping both CLKP_CNT and PWMP_CNT. However, PWMP_CNT does not necessarily need to be stopped. In view of this, Embodiment 5 will describe an example in which the output voltage Vhp is stopped by stopping CLKP_CNT while PWMP_CNT is maintained. Note that configurations in Embodiment 5 that are in common with Embodiment 4 are denoted by the same reference numerals so as to simplify the description.

Figure 19:
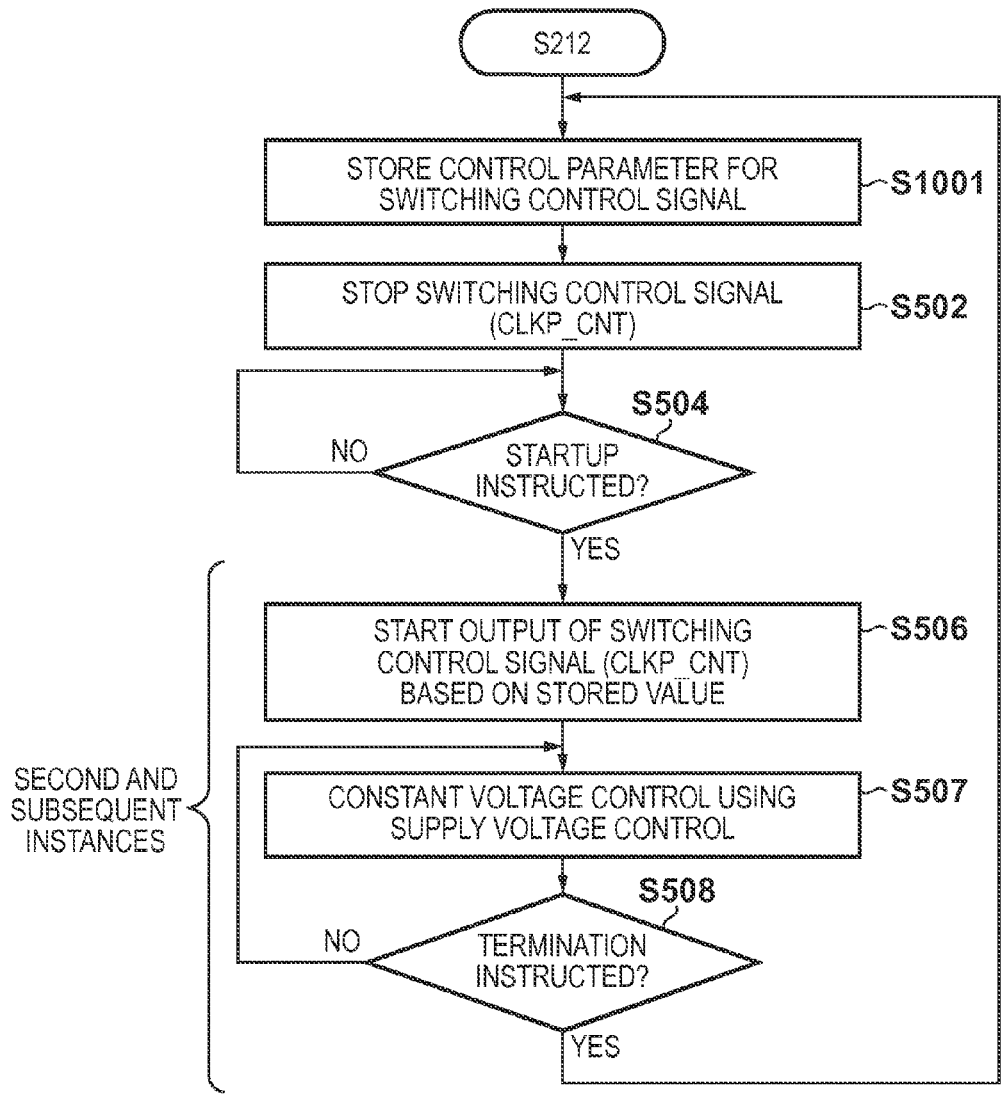
FIG. 19 is a flowchart showing an example of a method for controlling the voltage generating apparatus.

FIG. 19 is a flowchart showing operations executed by the controller 300 for the second and subsequent instances of raising the output voltage Vhp. The operations in the first instance are as described above in Embodiment 4. When the termination instruction is received in step S212, the procedure moves to step S1001.

In step S1001, the controller 300 stores the control parameter for CLKP_CNT in the storage unit 17. According to this, the control parameter for CLKP_CNT that was determined according to the first instance of raising (e.g., frequency, off time, duty ratio, or the like) is held in the storage unit 17. Next, the procedure moves to step S502. In step S502, the controller 300 (switching control unit 13) stops the output of CLKP_CNT. Next, step S503 is skipped, and the procedure moves to step S504. Here, the controller 300 continues outputting PWMP_CNT while the control parameter of PWMP_CNT is maintained. That is to say, even if the output voltage Vhp decreases, the supply voltage V1 is not adjusted. In step S504, the controller 300 (instruction monitoring unit 16) determines whether or not a startup instruction to start up the high-voltage power source unit 200 has been received from a superordinate controller that performs control of the controller 300. When the second and subsequent instances of raising the positive DC voltage Vhp+ are instructed, the procedure moves to step S506. In step S506, the controller 300 (switching control unit 13) reads out the control parameter stored in the storage unit 17 (stored value) so as to generate and output CLKP_CNT in accordance with the control parameter. In step S507, the controller 300 (supply voltage control unit 12) executes constant voltage control using PWMP_CNT such that the output voltage Vhp is maintained at the target value Vt. In step S508, the controller 300 (instruction monitoring unit 16) determines whether or not a termination instruction has been received from a superordinate controller. When a termination instruction is received, the output of the output voltage Vhp pertaining to the second instance is stopped. Here, the procedure returns to step S1001 in FIG. 19.

Thus, in Embodiment 5, the controller 300 stops the output voltage Vhp by stopping the output of CLKP_CNT while the output of PWMP_CNT is continued. The output of PWMP_CNT, which determines the supply voltage V1 that is applied to the primary side of the step-up transformer 1, is continued. Also, the control parameter of PWMP_CNT (e.g., PWM setting value) is kept as-is without being changed. According to this, the capacitor C2 is charged such that the voltage between the two ends of the capacitor C2 is maintained at the supply voltage V1, and therefore in the second and subsequent steps, the amount of time for charging the capacitor C2 is reduced. Also, since it is possible to omit the operation for resuming the generation and output of PWMP_CNT (step S505) based on the operation for stopping PWMP_CNT (step S503) and the stored value, the necessary processing time can be reduced. In other words, it is possible to raise the output voltage Vhp at an even higher speed. Note that in order to continue the output of PWMP_CNT, the control parameters of PWMP_CNT may be stored in the storage unit 17 in step S1001.

Embodiment 6

In Embodiments 4 and 5, the control parameters for PWMP_CNT and CLKP_CNT at the time of maintaining the output voltage Vhp at the target value Vt according to the first raising are stored in the storage unit 17. Accordingly, a correlation relationship exists between the target value Vt and the control parameters for PWMP_CNT and CLKP_CNT. In other words, it can be said that specific control parameters for reaching a target value Vt are stored in the storage unit 17. Note that the correlation relationship is dependent on the variation in the characteristics of the step-up transformer 1.

Incidentally, sometimes the target value Vt changes between the first and second instances. For example, if a long amount of time elapses between the first instance of raising and the second instance of raising, the environment condition will change, and therefore the target value Vt needs to be changed.

In double-sided image formation as well, it is necessary to change the target value Vt of the first side and the target value Vt of the second side. When the toner image is heat-fixed to the first side of the recording sheet, the resistance value of the recording sheet changes. In this case, the target value Vt of the second side needs to be set higher than the target value Vt of the first side. Thus, if the target value Vt changes between the first and second instances, all of the steps from S201 to S211 need to be executed for the second raising as well, and it is difficult to perform high-speed raising.

In view of this, in Embodiment 6, the controller 300 corrects the control parameter stored in the storage unit 17 by applying the correlation relationship obtained according to the first instance of raising to the target value Vt pertaining to the second instance. According to this, it is possible to control the output voltage Vhp so as to be at the target value Vt pertaining to the second instance even if there is a change between the target value Vt pertaining to the first instance and the target value Vt pertaining to the second instance.

Figure 20:
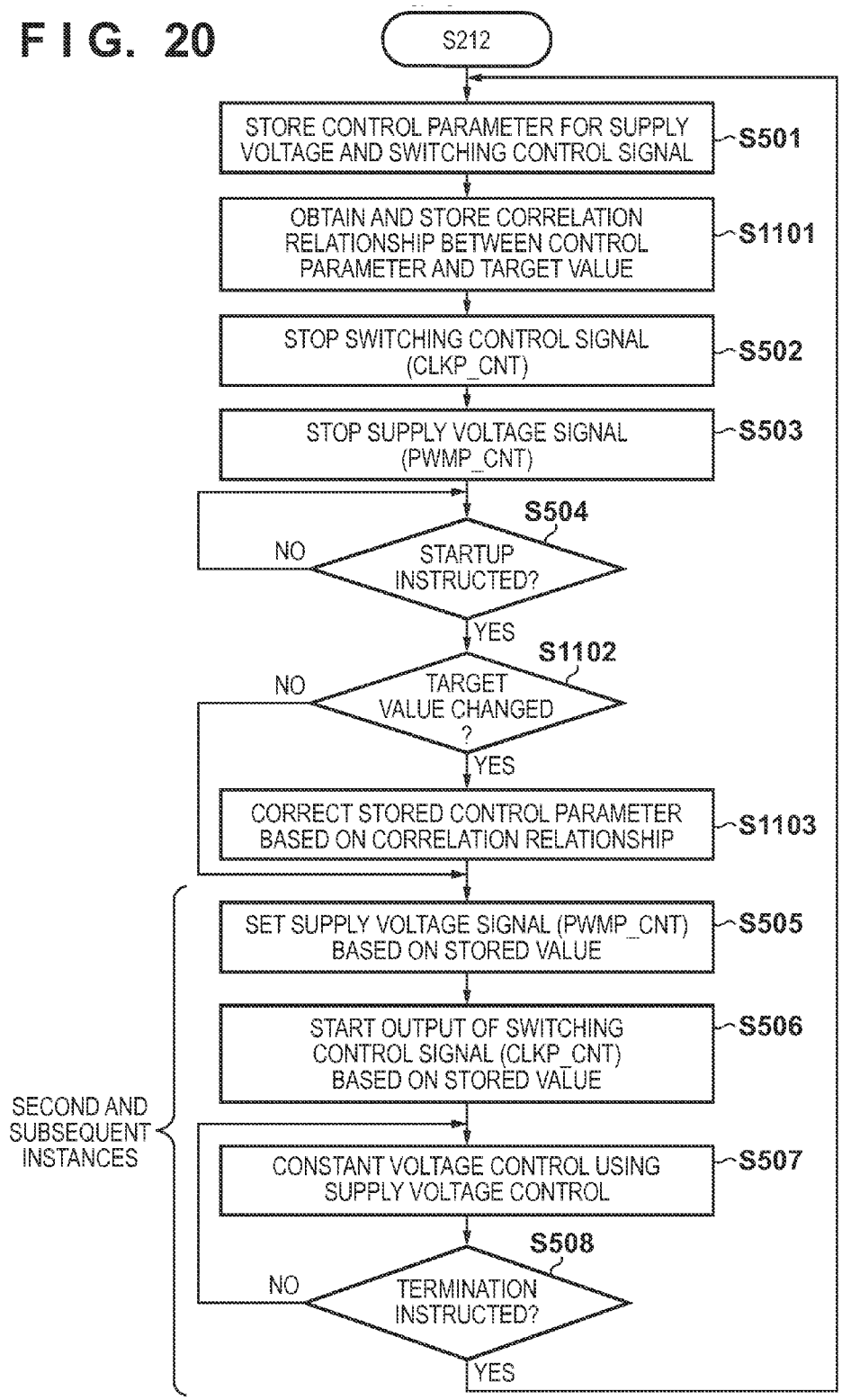
FIG. 20 is a flowchart showing an example of a method for controlling the voltage generating apparatus.

FIG. 20 is a flowchart showing operations executed by the controller 300 for the second and subsequent instances of raising the output voltage Vhp. Steps that have been described above are denoted by the same reference numerals. As can be understood by comparing FIGS. 20 and 17, step S1101 is provided between steps S501 and S502, and steps S1102 and S1103 have been added between steps S504 and S505.

In step S1101, the controller 300 (calculation unit 18) obtains the correlation relationship between the target value Vt and the control parameter and stores it in the storage unit 17. The correlation relationship is, for example, a function or a coefficient that defines a function. For example, it is assumed that the target value Vt and the adjusted setting value V1set' of PWMP_CNT are defined using a primary function $fp(Vt) = cp \cdot Vt$. In this case, the calculation unit 18 calculates the coefficient cp by dividing the adjusted setting value V1set' by the target value Vt and stores the result in the storage unit 17. Similarly, it is assumed that the target value Vt and the adjusted frequency f1 of CLKP_CNT are defined using a primary function $fc(Vt) = cc \cdot Vt$. In this case, the calculation unit 18 calculates the coefficient cc by dividing the adjusted frequency f1 by the target value Vt and stores the result in the storage unit 17. Thereafter, steps S502 to S504 are executed and procedure moves to step S1102. Thus, note that the calculation unit 18 of the controller 300 functions as an obtaining unit that obtains the correlation relationship between the first target value Vt and the parameter at the time when the output voltage Vhp is being maintained at the first target value Vt.

In step S1102, the controller 300 determines whether or not the target value Vt has been changed, or whether or not to change the target value Vt. For example, the controller 300 (instruction monitoring unit 16) determines that the target value Vt is to be changed when an instruction to change the target value Vt is received from a superordinate controller. The controller 300 (instruction monitoring unit 16) may determine that the target value Vt has been changed when the changed target value Vt' has been instructed from a superordinate controller. Alternatively, the controller 300 may measure the amount of time elapsed from the previous startup time to the present startup time using a timer or counter, and if the amount of time elapsed exceeds a threshold time, it may be determined that the target value Vt is to be changed. When the target value Vt is to be changed, the procedure moves to step S1103. On the other hand, if the target value Vt is not to be changed, the procedure moves to step S505. Note that the changed target value Vt' may be stored in advance in the storage unit 17. Also, as described in Embodiment 4, the changed target value Vt' may be determined according to the environment condition.

In step S1103, the controller 300 (correction unit 19) reads out the control parameter and the correlation relationship stored in the storage unit 17 and corrects the control parameter based on the correlation relationship. For example, the correction unit 19 reads out the coefficient cp and calculates the corrected setting value V1set" by substituting the coefficient cp and the changed target value Vt' into the function fp(Vt). Similarly, the correction unit 19 may read out the coefficient cc and calculate the corrected frequency f1" by substituting the coefficient cc and the changed target value Vt' into the function fc(Vt). The correction unit 19 updates the control parameter by writing the control parameter obtained in this way in the storage unit 17. Thereafter, the corrected control parameter is used in steps S505 and S506.

According to Embodiment 6 as described above, the calculation unit 18 uses an arithmetic operation to obtain the correlation relationship between the parameter and the first target value Vt at the time when the output voltage Vhp is maintained at the first target value Vt. Also, when the target value for the output voltage Vhp is changed from the first target value Vt to a second target value Vt', the correction unit 19 corrects the parameter based on the correlation relationship and the second target value Vt'. According to this, the parameter stored in the storage unit 17 is updated. In other words, the controller 300 updates the correlation relationship between the target value Vt and the control parameter and stores it in the storage unit 17, and thereby the control parameter can be corrected by applying the correlation relationship to the changed target value Vt'. For example, if the target value Vt changes between the first and second instances, it is possible to obtain the control parameter for the operations in the second instance of raising using the correlation relationship obtained in the first instance of constant voltage control. Accordingly, when the target value Vt is changed as well, high-speed raising of the output voltage is possible.

Variations

In the above-described Embodiments 4 to 6, the switching control unit 13 drives the step-up transformer 1 by controlling the frequency or the duty ratio of the switching control signal while the off time of the switching control signal is fixed. However, the switching control signal that can be applied in the present invention is not limited to the above-described examples, and it is possible to use a signal with a variable duty ratio (duty ratio control signal), and it is possible to use a signal with a variable frequency whose off time is not fixed (frequency control signal). Regarding the frequency control signal, the switching control unit 13 causes the output voltage Vhp to increase by sweeping the frequency from a high frequency to a low frequency, or from a low frequency to a high frequency. Also, the supply voltage control unit 12 may variably control the supply voltage V1 by supplying the supply voltage signal, which has been subjected to pulse width modulation according to the setting value V1set, to the voltage supply circuit 3.

Note that in Embodiment 4 to Embodiment 6, the threshold value Th1 is described as being one fixed value, but it is possible to use multiple threshold values Th. For example, the threshold value setting unit 11 may set a first threshold value Th1 that is lower than the target value Vt and a second threshold value Th2 that is higher than the target value Vt in the comparison unit 14. If the result of comparison by the comparison unit 14 indicates that the output voltage Vhp is less than or equal to the first threshold value Th1, the controller 300 employs switching control. Similarly, if the result of comparison by the comparison unit 14 indicates that the output voltage Vhp is greater than or equal to the threshold value Th2, the controller 300 employs switching control. On the other hand, if the result of comparison performed by the comparison unit 14 indicates that the output voltage Vhp is between the first threshold value Th1 and the second threshold value Th2, the controller 300 employs supply voltage control. If a large load variation is generated, sometimes the output voltage Vhp significantly diverges from the target value Vt. In such a case, the controller 300 can return the output voltage Vhp to the target value Vt at a high speed using switching control by which the voltage changes dramatically.

In this way, when the output voltage Vhp exceeds the second threshold value Th2 that is larger than the first threshold value Th1 and the target value Vt, the controller 300 functions as a control unit that switches from supply voltage control to switching control.

The above-described voltage generating apparatus 100 can be used in various electronic devices, and for example, it can be applied as a high-voltage power source apparatus of an electrophotographic image forming apparatus. By employing the above-described voltage generating apparatus 100 in the image forming apparatus 110, the FPOT of the image forming apparatus 110 can be shortened. FPOT is an abbreviation for First Print Out Time, and it refers to the amount of waiting time needed from when the image forming apparatus 110 is started, until when the first image is output. In particular, the FPOT of the image forming apparatus 110 can be shortened since the output voltage Vhp can be raised at a high speed using switching control. Furthermore, since the output voltage Vhp can be stabilized, image defects and the like that are caused by the output voltage being unstable, for example, can be reduced.

In Embodiments 4 to 6, the description focused on the positive unit 201, but the present invention may be applied to the negative unit 202. Furthermore, the storage of the control parameter and the correlation relationship can be applied to the timing for switching from the positive DC voltage Vhp+ to the negative DC voltage Vhp−, the timing for stopping the output of the positive DC voltage Vhp+, or the timing for switching from the negative DC voltage Vhp− to the positive DC voltage Vhp+. Also, the storage of the control parameter and the correlation relationship may be applied to the timing for stopping the output of the negative DC voltage Vhp− or the like. The reading-out and correction of the control parameter can be applied to the timing for outputting the positive DC voltage Vhp+ or the negative DC voltage Vhp− from the state in which output is stopped.

Incidentally, if the load varies widely, the output voltage Vhp sometimes decreases to less than the threshold value Th during constant voltage control. In such a case, the controller 300 may switch from supply voltage control to switching control so as to cause the output voltage Vhp to reach the threshold value Th. Alternatively, when transitioning to constant voltage control, the controller 300 changes the threshold value Th to a smaller threshold value Th'. In other words, increasing the absolute value of the difference between the target value and the threshold value of the output voltage by setting the threshold value farther away from the target voltage makes the output voltage Vhp less likely to fall below the threshold value Th'. According to this, since a return from the supply voltage control region to the switching control region can no longer readily occur, the output voltage Vhp will be stably controlled using supply voltage control.

In the above-described Embodiments 4 to 6, PWMP_CNT was stopped after CLKP_CNT was stopped, but the order may be reversed. That is to say, similar effects can be achieved by stopping CLKP_CNT after stopping PWMP_CNT.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-152097, filed Jul. 22, 2013, and No. 2013-152100, filed Jul. 22, 2013 which are hereby incorporated by reference herein in their entirety.

What is claimed is:

1. A voltage generating apparatus comprising:
a step-up transformer;
a switch circuit configured to drive the step-up transformer;
a signal generation unit configured to generate a switching control signal for driving the switch circuit;
a voltage supply circuit configured to generate a supply voltage for the primary side of the step-up transformer;
a setting value determining unit configured to determine a setting value for the supply voltage from the voltage supply circuit;
a voltage detection circuit configured to detect an output voltage on the secondary side of the step-up transformer; and
a control unit configured to control the switch circuit and the voltage supply circuit,
wherein the control unit is further configured to, until the output voltage reaches a threshold value before reaching a target value, perform switching control in which the output voltage is adjusted by adjusting the frequency or the duty ratio of the switching control signal, and
the control unit is further configured to, after the output voltage reaches the threshold value, perform supply voltage control in which the output voltage is adjusted by adjusting the supply voltage while the state of the switching control signal at the time when the output voltage reached the threshold value is maintained.

2. The voltage generating apparatus according to claim 1, further comprising:
an environment sensor configured to sense an environment condition; and
a target value determining unit configured to determine the target value based on the environment condition sensed by the environment sensor.

3. The voltage generating apparatus according to claim 1, further comprising:
a setting value determining unit configured to determine a setting value for the supply voltage according to the target value,
wherein the setting value determining unit is further configured to, until the output voltage reaches the threshold value, keep the setting value constant, and
the setting value determining unit is further configured to, after the output voltage reaches the threshold value, variably control the setting value.

4. The voltage generating apparatus according to claim 1, further comprising:
a threshold value determining unit configured to determine the threshold value according to the target value.

5. The voltage generating apparatus according to claim 1, further comprising:
a load detecting unit configured to detect the impedance of a load to which the output voltage is applied; and
a threshold value determining unit configured to determine the threshold value according to the impedance.

6. The voltage generating apparatus according to claim 1, wherein
when the output voltage exceeds a second threshold value that is greater than a first threshold value, which is the threshold value, and the target value, the control unit switches from the supply voltage control to the switching control.

7. The voltage generating apparatus according to claim 1, wherein
the signal generation unit is configured to control the output voltage by variably controlling the frequency of a switching control signal that is a pulse signal while the off time is fixed.

8. The voltage generating apparatus according to claim 1, wherein
the signal generation unit is configured to control the output voltage by variably controlling the duty ratio of the switching control signal that is a pulse signal.

9. The voltage generating apparatus according to claim 8, wherein
the signal control unit is configured to control the output voltage by sweeping the frequency of the switching control signal from a high frequency to a low frequency, or from a low frequency to a high frequency.

10. The voltage generating apparatus according to claim 1, wherein
the control unit is configured to variably control the supply voltage by supplying a supply voltage signal that has undergone pulse width modulation according to the setting value to the voltage supply circuit.

11. The voltage generating apparatus according to claim 1, further comprising:
an instruction monitoring unit configured to monitor for an instruction to start the output of the output voltage,
the target value, the setting value, and the threshold value are determined and the supply voltage is controlled so as to be at the setting value before the instruction monitoring unit detects the instruction, and
when the instruction monitoring unit detects the instruction, the control unit adjusts the frequency or the duty ratio of the switching control signal and starts raising the output voltage.

12. The voltage generating apparatus according to claim 11, wherein
the voltage supply circuit has a capacitor that is connected parallel to the primary side of the step-up transformer, and
before the instruction monitoring unit detects the instruction, the capacitor is charged such that the voltage between the two ends of the capacitor is the setting value.

13. The voltage generating apparatus according to claim 1, further comprising:
a storage unit configured to store a parameter that is one of the frequency and the duty ratio of the switching control signal at the time when the output voltage reached the threshold value, wherein
when the output voltage is to again be controlled so as to be at the target value after the output thereof has been stopped due to reaching the target value, the control unit reads out the parameter from the storage unit and controls the signal generation unit such that the switching control signal corresponding to the parameter is output.

14. The voltage generating apparatus according to claim 13, wherein
the storage unit also stores a fine adjustment value from the setting value for the supply voltage at the time when the output voltage is maintained at the target value, and
when the output voltage is to again be controlled so as to be at the target value after the output thereof has been stopped due to reaching the target value, the control unit furthermore reads out the fine adjustment value for the supply voltage from the storage unit, applies the fine adjustment value to the setting value so as to control the voltage supply circuit, and causes the supply voltage corresponding to the setting value and the fine adjustment value to be generated.

15. The voltage generating apparatus according to claim 13, wherein
the storage unit also stores the setting value for the supply voltage adjusted by the control unit at the time when the output of the output voltage is stopped, and
when the output voltage is to again be controlled so as to be at the target value after the output thereof has been stopped due to reaching the target value, the control unit furthermore reads out the adjusted setting value for the supply voltage from the storage unit, uses the setting value to control the voltage supply circuit, and causes the supply voltage corresponding to the setting value to be generated.

16. The voltage generating apparatus according to claim 13, wherein
the control unit is configured to stop the output of the output voltage that has reached the target value by stopping the generation of the switching control signal and the generation of the supply voltage.

17. The voltage generating apparatus according to claim 13, wherein
the control unit is configured to stop the output of the output voltage that has reached the target value by stopping the generation of the switching control signal and allows the generation of the supply voltage to be maintained.

18. The voltage generating apparatus according to claim 13, wherein
the polarity of the output voltage of the voltage generating apparatus is different from the polarity of the output voltage of another voltage generating apparatus that drives a load, and
the other voltage generating apparatus is further configured to supply the output voltage to the load in a period from the supply of the output voltage from the voltage generating apparatus until stopping the supply of the output voltage from the voltage generating apparatus, or in a state in which the supply of the output voltage from the voltage generating apparatus is stopped.

19. The voltage generating apparatus according to claim 13, wherein
when the output voltage reaches the target value, the control unit switches the threshold value such that it is set farther from the target value, and thus prevents a return from the supply voltage control to the switching control.

20. The voltage generating apparatus according to claim 13, further comprising:
an obtaining unit configured to obtain a correlation relationship between the parameter and the first target value at the time of maintaining the output voltage at the first target value; and
a correction unit configured to, when the target value for the output voltage is changed from the first target value to a second target value, correct the parameter based on the correlation relationship and the second target value and updates the parameter stored in the storage unit.

21. An image forming apparatus, comprising:
an image forming unit configured to form a toner image; and
an applying unit configured to apply a voltage to the image forming unit, the applying unit including:
a step-up transformer;
a switch circuit configured to drive the step-up transformer;
a signal generation unit configured to generate a switching control signal for driving the switch circuit;

a voltage supply circuit configured to generate a supply voltage for the primary side of the step-up transformer;

a setting value determining unit configured to determine a setting value for the supply voltage from the voltage supply circuit;

a voltage detection circuit configured to detect an output voltage on the secondary side of the step-up transformer; and a control unit configured to control the switch circuit and the voltage supply circuit, wherein the control unit is further configured to, until the output voltage reaches a threshold value before reaching a target value, perform switching control in which the output voltage is adjusted by adjusting the frequency or the duty ratio of the switching control signal, and the control unit is further configured to, after the output voltage reaches the threshold value, perform supply voltage control in which the output voltage is adjusted by adjusting the supply voltage while the state of the switching control signal at the time when the output voltage reached the threshold value is maintained.

22. A voltage generating apparatus comprising:
a transformer;
a driving part configured to drive the transformer;
a voltage supply part configured to generate a supply voltage for the primary side of the transformer;
a voltage detection part configured to detect an output voltage on the secondary side of the transformer; and
a control part configured to control the driving part and the voltage supply part,
wherein the control part is further configured to, until the output voltage of the transformer reaches a threshold value before reaching a target value for the output voltage, perform switching control in which the output voltage is adjusted by adjusting the frequency or the duty ratio of a switching control signal supplied to the driving part, and the control part is further configured to, after the output voltage reaches the threshold value, perform supply voltage control in which the output voltage is adjusted by adjusting the supply voltage while the state of the switching control signal at the time when the output voltage reached the threshold value is maintained.

23. An image forming apparatus, comprising:
an image forming unit configured to form a toner image; and
an applying unit configured to apply a voltage to the image forming unit, the applying unit including:
a transformer;
a driving part configured to drive the transformer;
a voltage supply part configured to generate a supply voltage for the primary side of the transformer;
a voltage detection part configured to detect an output voltage on the secondary side of the transformer; and
a control part configured to control the driving part and the voltage supply part,
wherein the control part is further configured to, until the output voltage of the transformer reaches a threshold value before reaching a target value for the output voltage, perform switching control in which the output voltage is adjusted by adjusting the frequency or the duty ratio of a switching control signal supplied to the driving part, and the control part is further configured to, after the output voltage reaches the threshold value, perform supply voltage control in which the output voltage is adjusted by adjusting the supply voltage while the state of the switching control signal at the time when the output voltage reached the threshold value is maintained.

* * * * *